US009973694B1

(12) United States Patent
van Hoff et al.

(10) Patent No.: US 9,973,694 B1
(45) Date of Patent: May 15, 2018

(54) IMAGE STITCHING TO FORM A THREE DIMENSIONAL PANORAMIC IMAGE

(71) Applicant: Jaunt Inc., Palo Alto, CA (US)

(72) Inventors: Arthur van Hoff, Palo Alto, CA (US); Thomas M. Annau, Palo Alto, CA (US); Daniel Kopeinigg, Palo Alto, CA (US)

(*) Notice: Subject to any disclaimer, the term of this patent is extended or adjusted under 35 U.S.C. 154(b) by 0 days. days.

(21) Appl. No.: 15/089,500

(22) Filed: Apr. 2, 2016

Related U.S. Application Data

(63) Continuation-in-part of application No. 14/465,581, filed on Aug. 21, 2014.

(60) Provisional application No. 62/142,909, filed on Apr. 3, 2015.

(51) Int. Cl.
   *H04N 5/232* (2006.01)
   *H04N 13/02* (2006.01)
   *H04N 13/00* (2018.01)
   *H04N 5/265* (2006.01)

(52) U.S. Cl.
   CPC ......... *H04N 5/23238* (2013.01); *H04N 5/265* (2013.01); *H04N 13/0022* (2013.01); *H04N 13/0242* (2013.01); *H04N 13/0271* (2013.01)

(58) Field of Classification Search
   CPC combination set(s) only.
   See application file for complete search history.

(56) References Cited

U.S. PATENT DOCUMENTS

| 6,865,289 | B1* | 3/2005 | Berestov | G06T 7/593 356/12 |
| 2011/0142132 | A1* | 6/2011 | Tourapis | H04N 19/597 375/240.16 |
| 2011/0157305 | A1* | 6/2011 | Kosakai | H04N 13/004 348/43 |
| 2012/0155786 | A1* | 6/2012 | Zargarpour | G03B 35/08 382/284 |
| 2013/0016186 | A1* | 1/2013 | Atanassov | H04N 13/0246 348/47 |
| 2013/0083159 | A1* | 4/2013 | Ooshima | G03B 35/02 348/36 |
| 2013/0266211 | A1* | 10/2013 | Tippetts | G06T 7/0051 382/154 |

(Continued)

FOREIGN PATENT DOCUMENTS

RU 2421933 C2 * 6/2011

*Primary Examiner* — Sathyanaraya V Perungavoor
*Assistant Examiner* — Janese Duley
(74) *Attorney, Agent, or Firm* — Burbage Law, P.C.; Jon-Michael Burbage

(57) ABSTRACT

The disclosure includes a system and method for stitching images. The system includes a processor and a memory storing instructions that, when executed, cause the system to: receive a group of images captured at a particular time by a group of camera modules, the group of camera modules configured to form camera pairs with respective overlap fields of view; calibrate the group of images; generate pairs of disparity maps associated with the camera pairs, the generating including generating a corresponding pair of disparity maps for each camera pair from the camera pairs; apply morphed rendering to create morphed images from the group of images; and construct a left panoramic image and a right panoramic image from the morphed images.

20 Claims, 18 Drawing Sheets

(56) References Cited

U.S. PATENT DOCUMENTS

2016/0286137 A1* 9/2016 Marks .................... G06T 3/4038
2016/0295194 A1* 10/2016 Wang ................... H04N 13/026

* cited by examiner

IMAGE STITCHING TO FORM A THREE DIMENSIONAL PANORAMIC IMAGE

CROSS REFERENCE TO RELATED APPLICATIONS

This application claims priority under 35 USC § 119(e) to U.S. Application No. 62/142,909, entitled "Image Stitching" filed Apr. 3, 2015. This application is a continuation-in-part of U.S. application Ser. No. 14/465,581, entitled "Image Stitching" filed Aug. 21, 2014, which claims priority under 35 USC § 119(e) to U.S. Application No. 61/868,527, entitled "Panoptic Virtual Presence System and Method" filed Aug. 21, 2013, U.S. Application No. 62/004,645, entitled "Camera Array Including Camera Modules" filed May 29, 2014, U.S. Application No. 62/008,215, entitled "Color Consensus" filed Jun. 5, 2014, and U.S. Application No. 62/029,254, entitled "Virtual Presence" filed Jul. 25, 2014. In addition, this application is related to U.S. application Ser. No. 14/444,938, entitled "Camera Array Including Camera Modules" filed Jul. 28, 2014, U.S. application Ser. No. 14/465,575, entitled "Aggregating Images and Audio Data to Generate Virtual Reality Content" filed Aug. 21, 2014, and U.S. application Ser. No. 14/465,570, entitled "Generating Content for a Virtual Reality System" filed Aug. 21, 2014. Each of the foregoing applications is herein incorporated in its entirety by reference.

FIELD

The implementations discussed herein are related to image stitching. More particularly, the implementations discussed herein relate to stitching two or more images together to form a three-dimensional (3D) panoramic image.

Two or more cameras located in different positions may capture images of a common scene. The images from the two or more cameras may be stitched together to form an aggregated image for the common scene. However, due to the disparity between the cameras, the aggregated image may have stitching artifacts (or, stitching errors) where the viewing angle switches from a first camera to a next neighboring camera. Objects that are far away from the cameras may have negligible disparity and there may be no stitching errors for the far-away objects. However, objects that are close to the cameras may have noticeable disparity and there may be stitching errors for the close-by objects. For example, close-by objects that cross a stitching boundary may abruptly transition between viewing angles and may thus produce an obvious visual discontinuity.

The subject matter claimed herein is not limited to implementations that solve any disadvantages or that operate only in environments such as those described above. Rather, this background is only provided to illustrate one example technology area where some implementations described herein may be practiced.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving a group of images captured at a particular time by a group of camera modules, the group of camera modules configured to form camera pairs with respective overlap fields of view; calibrating the group of images; generating, by a processor-based computing device programmed to perform the generating, pairs of disparity maps associated with the camera pairs, the generating including generating a corresponding pair of disparity maps for each camera pair from the camera pairs; creating morphed images from the group of images by applying morphed rendering, the creating including, for each camera pair that captures a first image and a second image in the group of images and is associated with the corresponding pair of disparity maps, generating a corresponding one of the morphed images from the first image and the second image based on the corresponding pair of disparity maps; and constructing a left panoramic image and a right panoramic image from the morphed images. Other embodiments of this aspect include corresponding computer systems, apparatus, and computer programs recorded on one or more computer storage devices, each configured to perform the actions of the methods.

Implementations may include one or more of the following features. The method where: each camera pair includes, from the group of camera modules, a first camera module and a second camera module that have an overlap field of view; the first image is captured by the first camera module and includes a first sub-image that covers at least part of the overlap field of view; the second image is captured by the second camera module and includes a second sub-image that covers the at least part of the overlap field of view; and creating the corresponding pair of disparity maps for each camera pair includes creating a first disparity map that maps the first sub-image to the second sub-image and a second disparity map that maps the second sub-image to the first sub-image. The method where creating the first disparity map that maps the first sub-image to the second sub-image includes: preprocessing the first sub-image and the second sub-image to normalize the first sub-image and the second sub-image; determining a first group of disparity vectors for a first group of pixels in the first sub-image; marking a second group of pixels in the first sub-image with unknown disparity vectors; applying a consistency test to the first group of pixels, the applying includes: determining a first sub-group of pixels that pass the consistency test from the first group of pixels, the first sub-group of pixels being associated with a first sub-group of disparity vectors from the first group of disparity vectors; determining a second sub-group of pixels that fail the consistency test from the first group of pixels; and marking the second sub-group of pixels with unknown disparity vectors; estimating a second group of disparity vectors for the second group of pixels and a second sub-group of disparity vectors for the second sub-group of pixels; and generating the first disparity map that includes the first sub-group of disparity vectors for the first sub-group of pixels, the second sub-group of disparity vectors for the second sub-group of pixels, and the second group of disparity vectors for the second group of pixels. The method further including performing boundary refinement at image areas with discontinuous disparity changes. The method where generating the corresponding one of the morphed images from the first image and the second image for each camera pair includes: determining view positions for multiple slit views between the first camera module and the second camera module; generating, from the first sub-image and the second sub-image, multiple sets of pixels for the multiple slit views based on the corresponding pair of disparity maps and the view positions, each slit view at a corresponding view position being associated with a corresponding set of pixels from the multiple sets of pixels; and combining the multiple sets of pixels to form the corresponding one of the morphed images. The method where the corresponding one of the morphed images represents a gradual morphing from the first sub-image to the second sub-image. The method further including: filling in pixels of the left panoramic image that are skipped during the morphed rendering; and filling in pixels of the right panoramic image that are skipped during the morphed rendering. Implementations of the described techniques may include hardware, a method or process, or computer software on a computer-accessible medium.

One general aspect includes a system including: one or more processors; one or more non-transitory tangible computer readable mediums communicatively coupled to the one or more processors and storing executable instructions executable by the one or more processors to perform operations including: receiving a group of images captured at a particular time by a group of camera modules, the group of camera modules configured to form camera pairs with respective overlap fields of view; calibrating the group of images; generating, by a processor-based computing device programmed to perform the generating, pairs of disparity maps associated with the camera pairs, the generating including generating a corresponding pair of disparity maps for each camera pair from the camera pairs; creating morphed images from the group of images by applying morphed rendering, the creating including, for each camera pair that captures a first image and a second image in the group of images and is associated with the corresponding pair of disparity maps, generating a corresponding one of the morphed images from the first image and the second image based on the corresponding pair of disparity maps; and constructing a left panoramic image and a right panoramic image from the morphed images. Other embodiments of this aspect include corresponding computer systems, apparatus, and computer programs recorded on one or more computer storage devices, each configured to perform the actions of the methods.

Implementations may include one or more of the following features. The system where: each camera pair includes, from the group of camera modules, a first camera module and a second camera module that have an overlap field of view; the first image is captured by the first camera module and includes a first sub-image that covers at least part of the overlap field of view; the second image is captured by the second camera module and includes a second sub-image that covers the at least part of the overlap field of view; and the instructions executable by the one or more processors perform creating the corresponding pair of disparity maps for each camera pair by: creating a first disparity map that maps the first sub-image to the second sub-image and a second disparity map that maps the second sub-image to the first sub-image. The system where the instructions executable by the one or more processors perform creating the first disparity map that maps the first sub-image to the second sub-image by: preprocessing the first sub-image and the second sub-image to normalize the first sub-image and the second sub-image; determining a first group of disparity vectors for a first group of pixels in the first sub-image; marking a second group of pixels in the first sub-image with unknown disparity vectors; applying a consistency test to the first group of pixels, the applying includes: determining a first sub-group of pixels that pass the consistency test from the first group of pixels, the first sub-group of pixels being associated with a first sub-group of disparity vectors from the first group of disparity vectors; determining a second sub-group of pixels that fail the consistency test from the first group of pixels; and marking the second sub-group of pixels with unknown disparity vectors; estimating a second group of disparity vectors for the second group of pixels and a second sub-group of disparity vectors for the second sub-group of pixels; and generating the first disparity map that includes the first sub-group of disparity vectors for the first sub-group of pixels, the second sub-group of disparity vectors for the second sub-group of pixels, and the second group of disparity vectors for the second group of pixels. The system where the operations further include performing boundary refinement at image areas with discontinuous disparity changes. The system where the instructions executable by the one or more processors perform generating the corresponding one of the morphed images from the first image and the second image for each camera pair by: determining view positions for multiple slit views between the first camera module and the second camera module; generating, from the first sub-image and the second sub-image, multiple sets of pixels for the multiple slit views based on the corresponding pair of disparity maps and the view positions, each slit view at a corresponding view position being associated with a corresponding set of pixels from the multiple sets of pixels; and combining the multiple sets of pixels to form the corresponding one of the morphed images. The system where the corresponding one of the morphed images represents a gradual morphing from the first sub-image to the second sub-image. The system where the operations further include: filling in pixels of the left panoramic image that are skipped during the morphed rendering; and filling in pixels of the right panoramic image that are skipped during the morphed rendering. Implementations of the described techniques may include hardware, a method or process, or computer software on a computer-accessible medium.

One general aspect includes a computer program product including a non-transitory computer-usable medium including a computer-readable program, where the computer-readable program when executed on a computer causes the computer to perform operations including: receiving a group of images captured at a particular time by a group of camera modules, the group of camera modules configured to form camera pairs with respective overlap fields of view; calibrating the group of images; generating, by a processor-based computing device programmed to perform the generating, pairs of disparity maps associated with the camera pairs, the generating including generating a corresponding pair of disparity maps for each camera pair from the camera pairs; creating morphed images from the group of images by applying morphed rendering, the creating including, for each camera pair that captures a first image and a second image in the group of images and is associated with the corresponding pair of disparity maps, generating a corresponding one of the morphed images from the first image and the second image based on the corresponding pair of disparity maps; and constructing a left panoramic image and a right panoramic image from the morphed images. Other embodiments of this aspect include corresponding computer systems, apparatus, and computer programs recorded on one or more computer storage devices, each configured to perform the actions of the methods.

Implementations may include one or more of the following features. The computer program product where: each camera pair includes, from the group of camera modules, a first camera module and a second camera module that have an overlap field of view; the first image is captured by the first camera module and includes a first sub-image that covers at least part of the overlap field of view; the second image is captured by the second camera module and includes a second sub-image that covers the at least part of the overlap field of view; and creating the corresponding pair of disparity maps for each camera pair includes creating a first disparity map that maps the first sub-image to the second sub-image and a second disparity map that maps the second sub-image to the first sub-image. The computer program product where creating the first disparity map that maps the first sub-image to the second sub-image includes: preprocessing the first sub-image and the second sub-image to normalize the first sub-image and the second sub-image; determining a first group of disparity vectors for a first group of pixels in the first sub-image; marking a second group of pixels in the first sub-image with unknown disparity vectors; applying a consistency test to the first group of pixels, the applying includes: determining a first sub-group of pixels that pass the consistency test from the first group of pixels, the first sub-group of pixels being associated with a first sub-group of disparity vectors from the first group of disparity vectors; determining a second sub-group of pixels that fail the consistency test from the first group of pixels; and marking the second sub-group of pixels with unknown disparity vectors; estimating a second group of disparity vectors for the second group of pixels and a second sub-group of disparity vectors for the second sub-group of pixels; and generating the first disparity map that includes the first sub-group of disparity vectors for the first sub-group of pixels, the second sub-group of disparity vectors for the second sub-group of pixels, and the second group of disparity vectors for the second group of pixels. The computer program product further including performing boundary refinement at image areas with discontinuous disparity changes. The computer program product where generating the corresponding one of the morphed images from the first image and the second image for each camera pair includes: determining view positions for multiple slit views between the first camera module and the second camera module; generating, from the first sub-image and the second sub-image, multiple sets of pixels for the multiple slit views based on the corresponding pair of disparity maps and the view positions, each slit view at a corresponding view position being associated with a corresponding set of pixels from the multiple sets of pixels; and combining the multiple sets of pixels to form the corresponding one of the morphed images. The computer program product where the corresponding one of the morphed images represents a gradual morphing from the first sub-image to the second sub-image. Implementations of the described techniques may include hardware, a method or process, or computer software on a computer-accessible medium.

According to one innovative aspect of the subject matter described in this disclosure, a system for stitching images to generate a left panoramic image and a right panoramic image includes one or more processors and one or more non-transitory tangible computer readable mediums communicatively coupled to the one or more processors and storing executable instructions executable by the one or more processors to perform operations including: receiving a group of images captured at a particular time by a group of camera modules, the group of camera modules configured to form camera pairs with respective overlap fields of view; calibrating the group of images; generating pairs of disparity maps associated with the camera pairs, the generating including generating a corresponding pair of disparity maps for each camera pair from the camera pairs; applying morphed rendering to create morphed images from the group of images, the creating including: for each camera pair that captures a first image and a second image in the group of images and is associated with the corresponding pair of disparity maps, generating a corresponding one of the morphed images from the first image and the second image based on the corresponding pair of disparity maps; and constructing a left panoramic image and a right panoramic image from the morphed images.

In general, another innovative aspect of the subject matter described in this disclosure may be embodied in methods that include: receiving a group of images captured at a particular time by a group of camera modules, the group of camera modules configured to form camera pairs with respective overlap fields of view; calibrating the group of images; generating, by a processor-based computing device programmed to perform the generating, pairs of disparity maps associated with the camera pairs, the generating including generating a corresponding pair of disparity maps for each camera pair from the camera pairs; applying morphed rendering to create morphed images from the group of images, the creating including: for each camera pair that captures a first image and a second image in the group of images and is associated with the corresponding pair of disparity maps, generating a corresponding one of the morphed images from the first image and the second image based on the corresponding pair of disparity maps; and constructing a left panoramic image and a right panoramic image from the morphed images.

Other aspects include corresponding methods, systems, apparatus, and computer program products for these and other innovative aspects.

These and other implementations may each optionally include one or more of the following operations and features. For instance, the features may include: each camera pair including, from the group of camera modules, a first camera module and a second camera module that have an overlap field of view; the first image being captured by the first camera module and including a first sub-image that covers at least part of the overlap field of view; the second image being captured by the second camera module and including a second sub-image that covers the at least part of the overlap field of view; and creating a first disparity map that maps the first sub-image to the second sub-image and a second disparity map that maps the second sub-image to the first sub-image; preprocessing the first sub-image and the second sub-image to normalize the first sub-image and the second sub-image; determining a first group of disparity vectors for a first group of pixels in the first sub-image; marking a second group of pixels in the first sub-image with unknown disparity vectors; applying a consistency test to the first group of pixels, where the applying includes: determining a first sub-group of pixels that pass the consistency test from the first group of pixels, the first sub-group of pixels being associated with a first sub-group of disparity vectors from the first group of disparity vectors; determining a second sub-group of pixels that fail the consistency test from the first group of pixels; marking the second sub-group of pixels with unknown disparity vectors; estimating a second group of disparity vectors for the second group of pixels and a second sub-group of disparity vectors for the second sub-group of pixels; generating the first disparity map that includes the first sub-group of disparity vectors for the first sub-group of pixels, the second sub-group of disparity vectors for the second sub-group of pixels, and the second group of disparity vectors for the second group of pixels; performing boundary refinement at image areas with discontinuous disparity changes; determining view positions for multiple slit views between the first camera module and the second camera module; generating, from the first sub-image and the second sub-image, multiple sets of pixels for the multiple slit views based on the corresponding pair of disparity maps and the view positions, each slit view at a corresponding view position being associated with a corresponding set of pixels from the multiple sets of pixels; combining the multiple sets of pixels to form the corresponding one of the morphed images; and the corresponding one of the morphed images representing a gradual morphing from the first sub-image to the second sub-image. For instance, the operations include: filling in pixels of the left panoramic image that are skipped during the morphed rendering; and filling in pixels of the right panoramic image that are skipped during the morphed rendering.

The object and advantages of the implementations will be realized and achieved at least by the elements, features, and combinations particularly pointed out in the claims.

It is to be understood that both the foregoing general description and the following detailed description are exemplary and explanatory and are not restrictive of the disclosure, as claimed.

BRIEF DESCRIPTION OF THE DRAWINGS

Example implementations will be described and explained with additional specificity and detail through the use of the accompanying drawings in which.

DETAILED DESCRIPTION OF EXAMPLE IMPLEMENTATIONS

The present disclosure relates to stitching images to form a panoramic image.

Some implementations described herein may include an aggregation system. The aggregation system may receive images that are captured at a particular time by camera modules and may stitch the images to form a left panoramic image and a right panoramic image for the particular time. By generating left panoramic images and right panoramic images for different times, the aggregation system may generate a stream of 3D video data that includes a stream of left panoramic images for left eye viewing and a stream of right panoramic images for right eye viewing.

The aggregation system may include a disparity module, a calibration module, and a stitching module. The disparity module may compute disparity maps for determining pixel correspondence between overlapped images. The calibration module may determine adjustments to align images captured by a camera array so that pixel correspondence between overlapped images may be epipolar and consistent. The stitching module may determine spherical panoramas from the images calibrated by the calibration module. The spherical panoramas may be determined using morphed rendering based on the disparity maps to eliminate or reduce stitching artifacts.

Implementations of the present disclosure will be explained with reference to the accompanying drawings.

Figure 1:
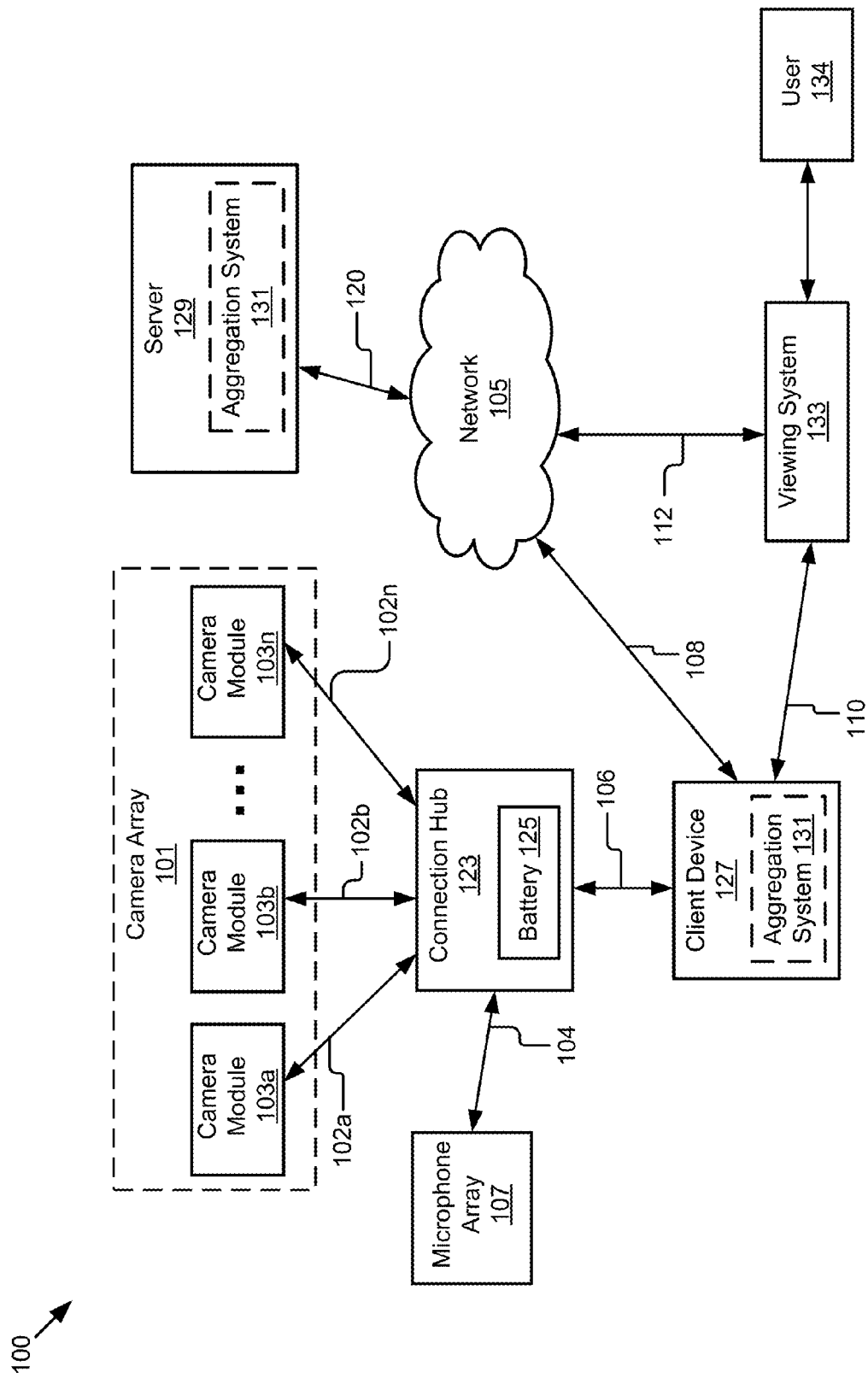
FIG. 1 illustrates a block diagram of some implementations of an example system that collects and aggregates images and audio data to generate VR content.

FIG. 1 illustrates a block diagram of some implementations of an example system 100 that collects and aggregates images and audio data to generate VR content, arranged in accordance with at least some implementations described herein. The illustrated system 100 includes a camera array 101, a connection hub 123, a microphone array 107, a client device 127, and a viewing system 133. In some implementations, the system 100 additionally includes a server 129. The client device 127, the viewing system 133, and the server 129 may be communicatively coupled via a network 105. The system 100 may include other devices not shown in FIG. 1, such as a social network server, a content server, and an advertisement (ad) server, etc.

The separation of various components and servers in the implementations described herein should not be understood as requiring such separation in all implementations, and it should be understood that the described components and servers may generally be integrated together in a single component or server. Additions, modifications, or omissions may be made to the illustrated implementation without departing from the scope of the present disclosure, as will be appreciated in view of the present disclosure.

While FIG. 1 illustrates one camera array 101, one connection hub 123, one microphone array 107, one client device 127, one server 129, and one viewing system 133, the present disclosure applies to a system architecture having one or more camera arrays 101, one or more connection hubs 123, one or more microphone arrays 107, one or more client devices 127, one or more servers 129, and one or more viewing systems 133. Furthermore, although FIG. 1 illustrates one network 105 coupled to the entities of the system 100, in practice one or more networks 105 may be connected to these entities and the one or more networks 105 may be of various and different types.

The camera array 101 may be a modular camera system configured to capture raw video data that includes images. In the illustrated implementation shown in FIG. 1, the camera array 101 includes camera modules 103a, 103b . . . 103n (also referred to individually and collectively herein as camera module 103). While three camera modules 103a, 103b, 103n are illustrated in FIG. 1, the camera array 101 may include any number of camera modules 103. The camera array 101 may be constructed using individual cameras with each camera module 103 including one individual camera. In some implementations, the camera array 101 may also include various sensors including, but not limited to, a depth sensor, a motion sensor (e.g., a global positioning system (GPS), an accelerometer, a gyroscope, etc.), a sensor for sensing a position of the camera array 101, and other types of sensors.

The camera array 101 may be constructed using various configurations. For example, the camera modules 103a, 103b . . . 103n in the camera array 101 may be configured in different geometries (e.g., a sphere, a line, a cylinder, a cone, and a cubic, etc.) with the corresponding lenses in the camera modules 103a, 103b . . . 103n facing toward different directions. For example, the camera array 101 may include 32 Point Grey Blackfly Gigabit Ethernet cameras distributed around a 20 centimeter diameter sphere. Camera models that are different from the Point Grey Blackfly camera model may be included in the camera array 101. For example, in some implementations the camera array 101 may include a sphere whose exterior surface is covered in one or more optical sensors configured to render 3D images or video. The optical sensors may be communicatively coupled to a controller. The entire exterior surface of the sphere may be covered in optical sensors configured to render 3D images or video.

In some implementations, the camera modules 103 in the camera array 101 are configured to have a sufficient field of view overlap so that all objects can be seen from more than one view point. For example, the horizontal field of view for each camera module 103 included in the camera array 101 is 70 degrees. In some implementations, having the camera array 101 configured in such a way that an object may be viewed by more than one camera module 103 is beneficial for correcting stitching errors, exposure or color deficiencies in the images captured by the camera array 101.

The camera modules 103 in the camera array 101 may be configured to form camera pairs so that each camera pair may include two adjacent camera modules 103 that may have an overlap field of view. Two adjacent camera pairs may include a common camera module 103. For example, a first camera pair may include a first camera module 103 and a second camera module 103 that may have a first overlap field of view. A second camera pair adjacent to the first camera pair may include the second camera module 103 and a third camera module 103 that may have a second overlap field of view. The first overlap field of view may or may not overlap with the second overlap field of view.

Each of the camera modules 103 may include one or more processors, one or more memory devices (e.g., a secure digital (SD) memory card, a secure digital high capacity (SDHC) memory card, a secure digital extra capacity (SDXC) memory card, and a compact flash (CF) memory card, etc.), an optical sensor (e.g., semiconductor charge-coupled devices (CCD), active pixel sensors in complementary metal-oxide-semiconductor (CMOS), and N-type metal-oxide-semiconductor (NMOS, Live MOS), etc.), a depth sensor (e.g., PrimeSense depth sensor), a lens (e.g., a camera lens), and other suitable components.

Example implementations of the camera array 101 and camera modules 103 are described in U.S. application Ser. No. 14/444,938, titled "Camera Array Including Camera Modules," filed Jul. 28, 2014, which is herein incorporated in its entirety by reference.

The camera modules 103 may be coupled to the connection hub 123. For example, the camera module 103a is communicatively coupled to the connection hub 123 via a signal line 102a, the camera module 103b is communicatively coupled to the connection hub 123 via a signal line 102b, and the camera module 103n is communicatively coupled to the connection hub 123 via a signal line 102n. In some implementations, a signal line in the disclosure may represent a wired connection or any combination of wired connections such as connections using Ethernet cables, high-definition multimedia interface (HDMI) cables, universal serial bus (USB) cables, RCA cables, Firewire, CameraLink, or any other signal line suitable for transmitting video data and audio data. Alternatively, a signal line in the disclosure may represent a wireless connection such as a wireless fidelity (Wi-Fi) connection or a Bluetooth connection.

The microphone array 107 may include one or more microphones configured to capture sounds from different directions in an environment. In some implementations, the microphone array 107 may include one or more processors and one or more memories. The microphone array 107 may include a heat dissipation element. In the illustrated implementation, the microphone array 107 is coupled to the connection hub 123 via a signal line 104. Alternatively or additionally, the microphone array 107 may be directly coupled to other entities of the system 100 such as the client device 127.

The microphone array 107 may capture sound from various directions. The sound may be stored as raw audio data on a non-transitory memory communicatively coupled to the microphone array 107. The microphone array 107 may detect directionality of the sound. The directionality of the sound may be encoded and stored as part of the raw audio data.

In some implementations, the microphone array 107 may include a Core Sound Tetramic soundfield tetrahedral microphone array following the principles of ambisonics, enabling reconstruction of sound from any arbitrary direction. For example, the microphone array 107 may include an ambisonics microphone mounted on top of the camera array 101 and used to record sound and sonic directionality. In some implementations, the microphone array 107 includes a Joseph Grado HMP-1 recording system, or any other microphone system configured according to the same or similar acoustical principles.

In some implementations, the camera modules 103 may be mounted around a camera housing (e.g., a spherical housing or a housing with another suitable shape). The microphone array 107 may include multiple microphones mounted around the same camera housing, with each microphone located in a different position. The camera housing may act as a proxy for the head-shadow sound-blocking properties of a human head. During playback of the recorded audio data, an audio track may be selected for a user's ear from a microphone that has a closest orientation to the user's ear. Alternatively, the audio track for the user's ear may be interpolated from audio tracks recorded by microphones that are closest to the user's ear.

The connection hub 123 may receive the raw audio data recorded by the microphone array 107 and forward the raw audio data to the client device 127 for processing and storage. The connection hub 123 may also receive and aggregate streams of raw video data describing images captured by the respective camera modules 103. The connection hub 123 may then transfer the raw video data to the client device 127 for processing and storage. The connection hub 123 is communicatively coupled to the client device 127 via a signal line 106. In some examples, the connection hub 123 may be a USB hub. In some implementations, the connection hub 123 includes one or more batteries 125 for supplying power to the camera modules 103 in the camera array 101. Alternatively or additionally, one or more batteries 125 may be coupled to the connection hub 123 for providing power to the camera modules 103.

The client device 127 may be a processor-based computing device. For example, the client device 127 may be a personal computer, laptop, tablet computing device, smartphone, set top box, network-enabled television or any other processor based computing device. In some implementations, the client device 127 includes network functionality and is communicatively coupled to the network 105 via a signal line 108. The client device 127 may be configured to transmit data to the server 129 or to receive data from the server 129 via the network 105.

The client device 127 may receive raw video data and raw audio data from the connection hub 123. In some implementations, the client device 127 may store the raw video data and raw audio data locally in a storage device associated with the client device 127. Alternatively, the client device 127 may send the raw video data and raw audio data to the server 129 via the network 105 and may store the raw video data and the audio data on a storage device associated with the server 129. In some implementations, the client device 127 includes an aggregation system 131 for aggregating raw video data captured by the camera modules 103 to form 3D video data and aggregating raw audio data captured by the microphone array 107 to form 3D audio data. Alternatively or additionally, the aggregation system 131 may be operable on the server 129.

The aggregation system 131 may be stored on a single device or a combination of devices of FIG. 1. In some implementations, the aggregation system 131 can be implemented using hardware including a field-programmable gate array ("FPGA") or an application-specific integrated circuit ("ASIC"). In some other implementations, the aggregation system 131 may be implemented using a combination of hardware and software. Example implementations of the aggregation system 131 are described in U.S. application Ser. No. 14/465,575, entitled "Aggregating Images and Audio Data to Generate Virtual Reality Content" filed Aug. 21, 2014, and U.S. application Ser. No. 14/465,581, entitled "Image Stitching" filed Aug. 21, 2014, which are herein incorporated in their entirety by reference. The aggregation system 131 is described below in more detail with reference to FIGS. 3-6E.

The viewing system 133 may include or use a computing device to decode and render a stream of 3D video data on a VR display device (e.g., Oculus Rift VR display) or other suitable display devices that include, but are not limited to: augmented reality glasses; televisions, smartphones, tablets, or other devices with 3D displays and/or position tracking sensors; and display devices with a viewing position control, etc. The viewing system 133 may also decode and render a stream of 3D audio data on an audio reproduction device (e.g., a headphone or other suitable speaker devices). The viewing system 133 may include the VR display configured to render the 3D video data and the audio reproduction device configured to render the 3D audio data. The viewing system 133 may be coupled to the client device 127 via a signal line 110 and the network 105 via a signal line 112. A user 134 may interact with the viewing system 133.

In some implementations, the viewing system 133 may receive VR content from the client device 127. Alternatively or additionally, the viewing system 133 may receive the VR content from the server 129. The viewing system 133 may also be coupled to the aggregation system 131 and may receive the VR content from the aggregation system 131. The VR content may include one or more of a stream of 3D video data, a stream of 3D audio data, a compressed stream of 3D video data, a compressed stream of 3D audio data, a combined stream of 3D video data and 3D audio data, and other suitable content.

The viewing system 133 may track a head orientation of the user 134. For example, the viewing system 133 may include one or more accelerometers or gyroscopes used to detect a change in the user's head orientation. The viewing system 133 may decode and render the stream of 3D video data on a VR display device and the stream of 3D audio data on a speaker system based on the head orientation of the user 134. As the user 134 changes his or her head orientation, the viewing system 133 may adjust the rendering of the 3D video data and 3D audio data based on the changes of the user's head orientation.

In some implementations, the viewing system 133 includes a peripheral device such as a microphone, camera, mouse, or keyboard that is configured to enable the user 134 to provide an input to one or more components of the system 100. In some implementations, the peripheral device includes a camera such as the Microsoft® Kinect or another similar device, which allows the user 134 to provide gesture inputs to the viewing system 133 or other entities of the system 100.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, email, etc.

The server 129 may be a hardware server that includes a processor, a memory, and network communication capabilities. In the illustrated implementation, the server 129 is coupled to the network 105 via a signal line 120. The server 129 sends and receives data to and from one or more of the other entities of system 100 via the network 105. For example, the server 129 receives VR content including a stream of 3D video data (or compressed 3D video data) and a stream of 3D audio data (or compressed 3D audio data) from the client device 127 and stores the VR content on a storage device associated with the server 129. Alternatively, the server 129 includes the aggregation system 131 that receives raw video data and raw audio data from the client device 127 and aggregates the raw video data and raw audio data to generate the VR content. The viewing system 133 may access the VR content from the server 129 or the client device 127.

Figures 2A, 2B:
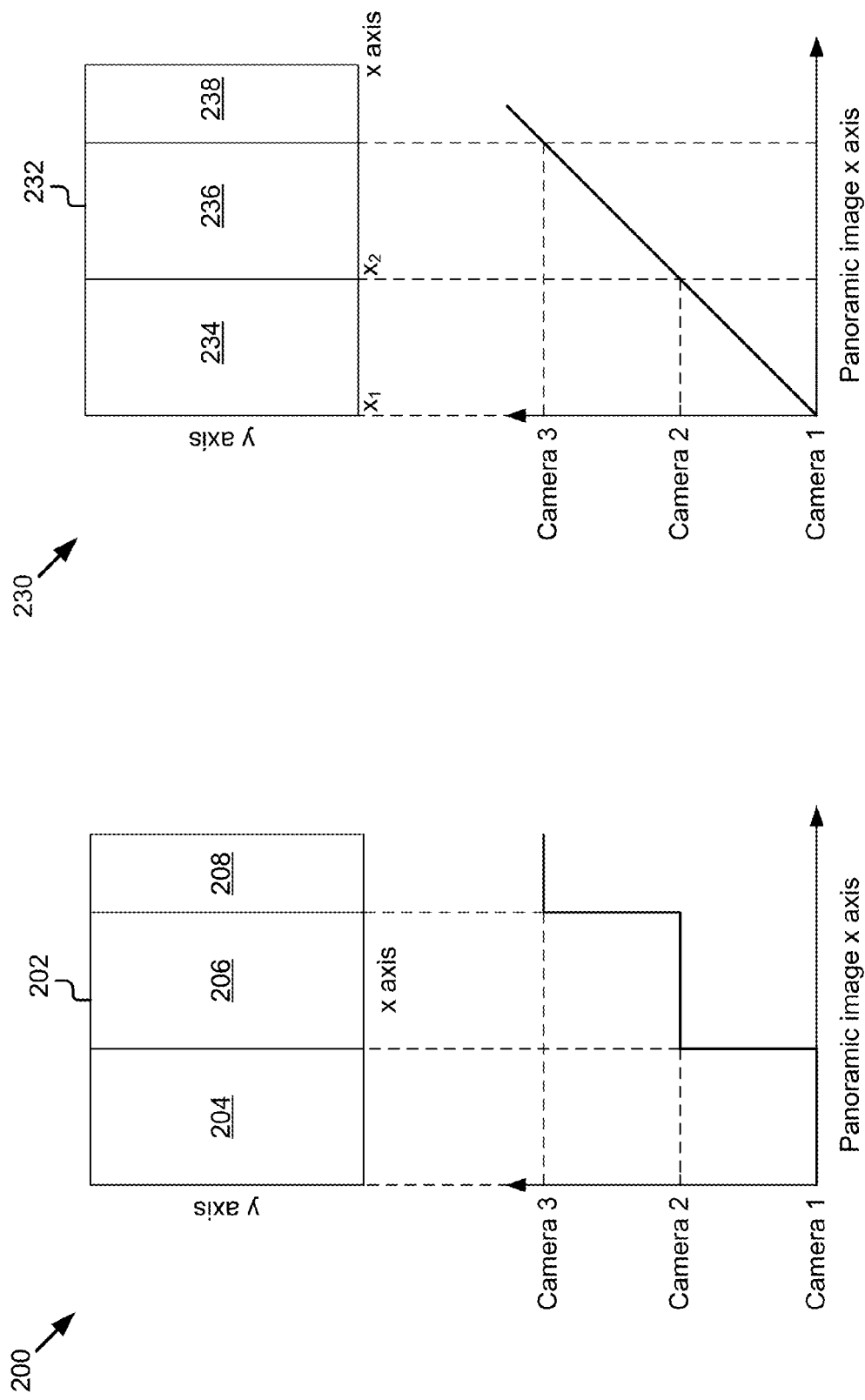
FIGS. 2A-2D are graphic representations that illustrate various image stitching approaches according to some implementations.

FIGS. 2A-2D are graphic representations 200, 230, 260, and 290 that illustrate various image stitching approaches according to some implementations. Referring to FIG. 2A, a panoramic image 202 may be stitched from a first image captured by Camera 1, a second image captured by Camera 2, a third image captured by Camera 3, and other images captured by other cameras. For example, a first portion 204 of the panoramic image 202 may include pixels directly from the first image captured by Camera 1. A second portion 206 of the panoramic image 202 may include pixels directly from the second image captured by Camera 2. A third portion 208 of the panoramic image 202 may include pixels directly from the third image captured by Camera 3. Discontinuity of pixels (or stitching artifacts) may occur at a first stitching border between the first portion 204 and the second portion 206, a second stitching border between the second portion 206 and the third portion 208, and other possible stitching borders.

Referring to FIG. 2B, a panoramic image 232 may include a first morphed image 234 that may transition smoothly from Camera 1's view to Camera 2's view, a second morphed image 236 that may transition smoothly from Camera 2's view to Camera 3's view, a third morphed image 238 that may transition smoothly from Camera 3's view to a next camera view, and other possible morphed images. Compared to the panoramic image 202 of FIG. 2A, stitching artifacts on stitching borders of the panoramic image 232 may be reduced or eliminated. The morphed rendering is described below in more detail with reference to FIGS. 3 and 5A-5B.

In general, each morphed image may include pixels transitioning from a start view to an end view, and may be created from (1) a first image captured by a first camera located in a start view position and (2) a second image captured by a second camera located in an end view position. The first camera and the second camera may have an overlap field of view. A morphed image may include different sets of pixels, with each set of pixels (e.g., one or more columns of pixels) corresponding to a different slit view of a slit camera at a corresponding view position. For example, a set of pixels at the start view position may be the same as corresponding pixels in the first image captured by the first camera. A set of pixels at the end view position may be the same as corresponding pixels in the second image captured by the second camera. Other sets of pixels at view positions between the start view position and the end view position may be obtained from the first image and the second image using morphed rendering.

For example, referring to FIG. 2B, a set of pixels of the first morphed image 234 at a start view position $x_1$ may be the same as corresponding pixels of the first image captured by Camera 1. A set of pixels of the first morphed image 234 at an end view position $x_2$ may be the same as corresponding pixels of the second image captured by Camera 2. Other sets of pixels of the first morphed image 234 between the start view position $x_1$ and the end view position $x_2$ may include different blendings of corresponding pixels in the first image and corresponding pixels in the second image.

Figure 2D:
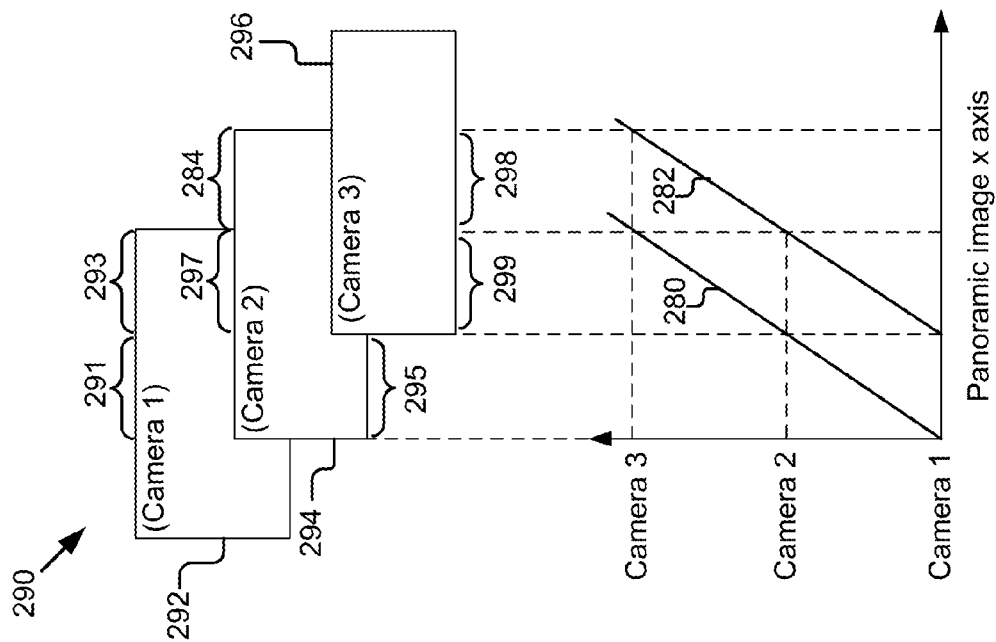
Figure 2C:
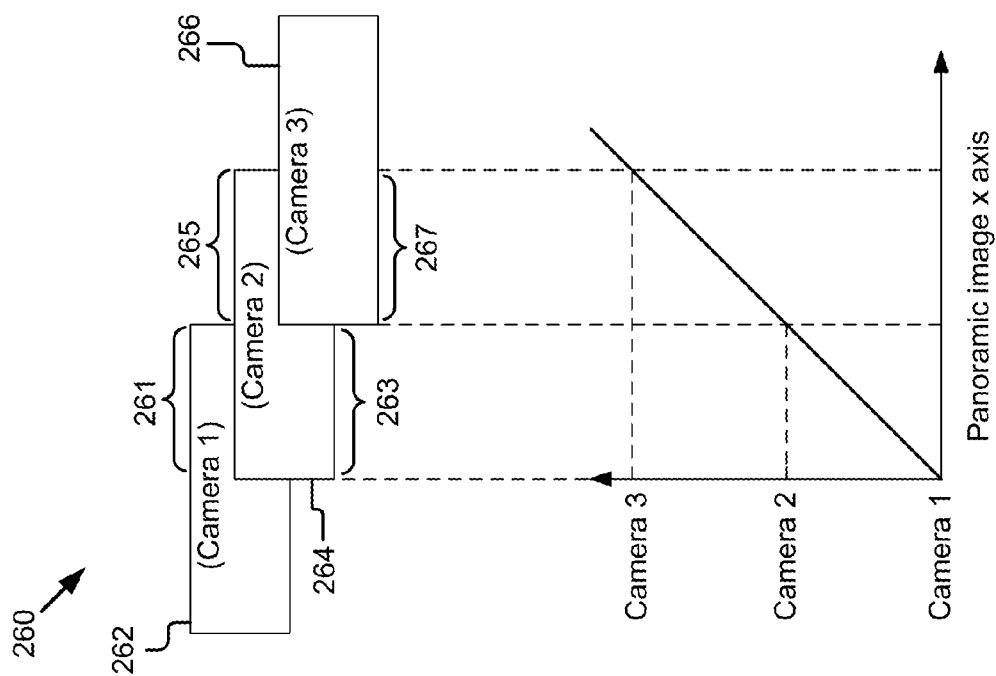

FIG. 2C illustrates that each pixel in a panorama may be seen by two cameras, which may be referred to as 2× overlap for each pixel. Camera 1 and Camera 2 may form a first camera pair with a first overlap field of view. The first overlap field of view is about 50% of a field of view of Camera 1 (or 50% of a field of view of Camera 2), causing 50% of an image 262 captured by Camera 1 and 50% of an image 264 captured by Camera 2 to overlap in the first overlap field of view. A sub-image 261 of the image 262 and a sub-image 263 of the image 264 may cover the entire first overlap field of view.

Camera 2 and Camera 3 may form a second camera pair with a second overlap field of view. The second overlap field of view does not overlap with the first overlap field of view. The second overlap field of view is about 50% of a field of view of Camera 3 (or 50% of the field of view of Camera 2), causing half of the image 264 captured by Camera 2 and half of an image 266 captured by Camera 3 to overlap in the second overlap field of view. A sub-image 265 of the image 264 and a sub-image 267 of the image 266 may cover the entire second overlap field of view.

FIG. 2D illustrates that each pixel in a panorama may be seen by three cameras, which may be referred to as 3× overlap for each pixel. Camera 1 captures an image 292, Camera 2 captures an image 294, and Camera 3 captures an image 296. Camera 1 and Camera 2 may form a first camera pair with a first overlap field of view, and Camera 2 and Camera 3 may form a second camera pair with a second overlap field of view. The first overlap field of view is about 66.7% (⅔≈66.7%) of a field of view of Camera 1 (or 66.7% of a field of view of Camera 2). The second overlap field of view is about 66.7% of a field of view of Camera 3 (or 66.7% of the field of view of Camera 2). The first overlap field of view overlaps with the second overlap field of view.

A sub-image 291 of the image 292 and a sub-image 295 of the image 294 may cover a first part of the first overlap field of view, and may be used to generate a first morphed image that covers the first part of the first overlap field of view. A sub-image 297 of the image 294 and a sub-image 299 of the image 296 may cover a second part of the first overlap field of view, and may be used to generate a second morphed image that covers the second part of the first overlap field of view. The first morphed image and the second morphed image may be used to construct a left panoramic image or a right panoramic image as illustrated in a line 280.

A sub-image 293 of the image 292 and a sub-image 297 of the image 294 may cover a first part of the second overlap field of view, and may be used to generate a third morphed image that covers the first part of the second overlap field of view. The first part of the second overlap field of view is the same as the second part of the first overlap field of view. A sub-image 284 of the image 294 and a sub-image 298 of the image 296 may cover a second part of the second overlap field of view, and may be used to generate a fourth morphed image that covers the second part of the second overlap field of view. The third morphed image and the fourth morphed image may be used to construct a left panoramic image or a right panoramic image as illustrated in a line 282.

In general, morphing may reduce parallax in the images even though parallax may be beneficial for 3D image construction. Nevertheless, parallax may be created through an overlap of pixels which is greater than 2× overlap, indicating that an overlap field of view of two adjacent cameras may be greater than 50% of an entire field of view of each camera. If the overlap of pixels is not greater than 2× overlap, extrapolation of occluded background may be used to create parallax.

Figure 3:
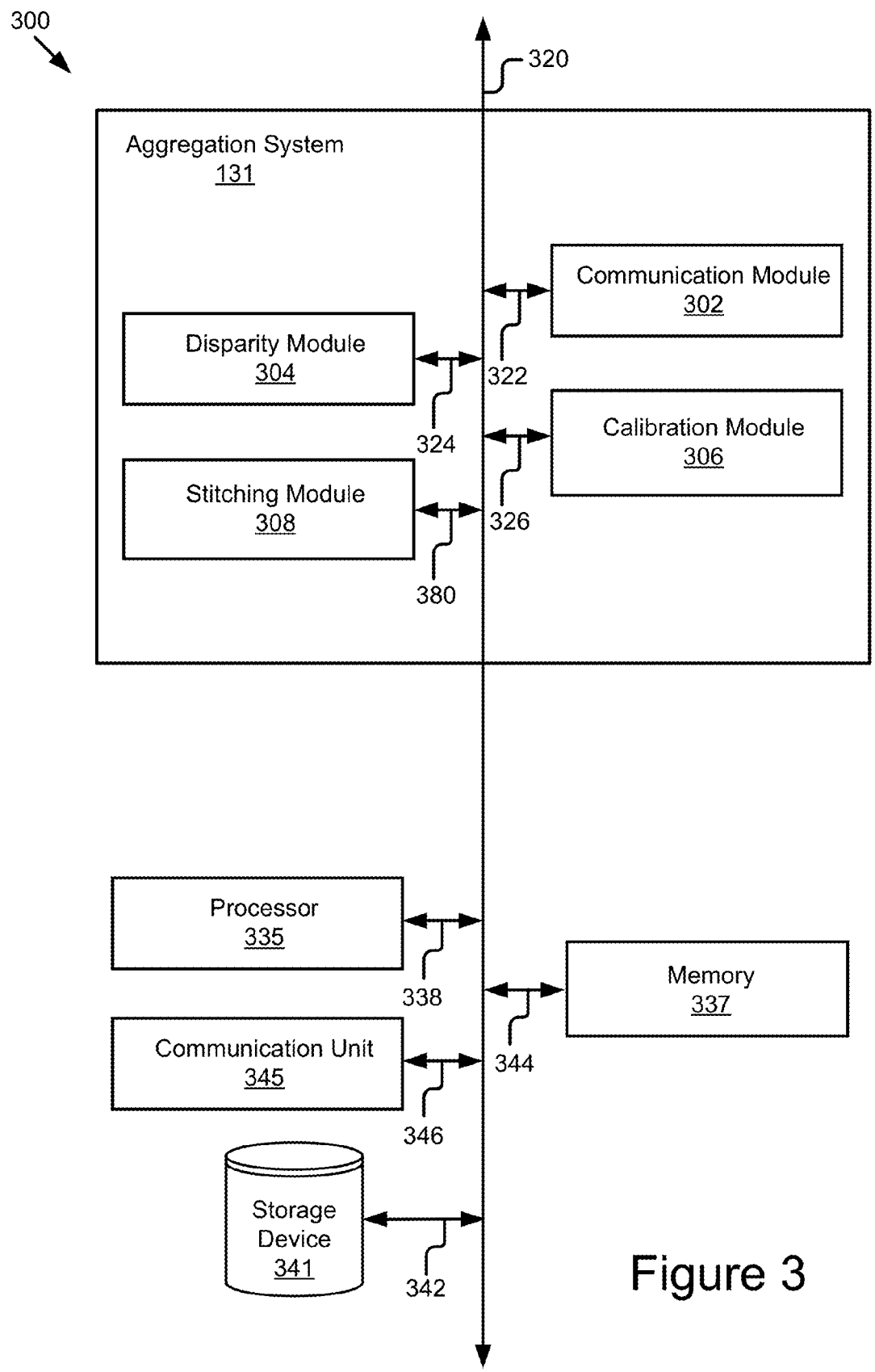
FIG. 3 illustrates a block diagram of some implementations of a computing device that includes an example aggregation system.

Referring now to FIG. 3, an example of the aggregation system 131 is illustrated in accordance with at least some implementations described herein. FIG. 3 is a block diagram of a computing device 300 that includes the aggregation system 131, a memory 337, a processor 335, a storage device 341, and a communication unit 345. In the illustrated implementation, the components of the computing device 300 are communicatively coupled by a bus 320. In some implementations, the computing device 300 may be a personal computer, smart phone, tablet computer, set top box or any other processor-based computing device. The computing device 300 may be one of the client device 127, the server 129, or another device in the system 100 of FIG. 1.

The processor 335 may include an arithmetic logic unit, a microprocessor, a general purpose controller, or some other processor array to perform computations and provide electronic display signals to a display device. The processor 335 is coupled to the bus 320 for communication with the other components via a signal line 338. The processor 335 may process data signals and may include various computing architectures including a complex instruction set computer (CISC) architecture, a reduced instruction set computer (RISC) architecture, or an architecture implementing a combination of instruction sets. Although FIG. 3 includes a single processor 335, multiple processors may be included. Other processors, operating systems, sensors, displays and physical configurations may be possible.

The memory 337 includes a non-transitory memory that stores data for providing the functionality described herein. The memory 337 may be a dynamic random access memory (DRAM) device, a static random access memory (SRAM) device, flash memory or some other memory devices. In some implementations, the memory 337 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The memory 337 may store the code, routines and data for the aggregation system 131 to provide its functionality. The memory 337 is coupled to the bus 320 via a signal line 344.

The communication unit 345 may transmit data to any of the entities of the system 100 depicted in FIG. 1. Similarly, the communication unit 345 may receive data from any of the entities of the system 100 depicted in FIG. 1. The communication unit 345 may include one or more Ethernet switches for receiving the raw video data and the raw audio data from the connection hub 123. The communication unit 345 is coupled to the bus 320 via a signal line 346. In some implementations, the communication unit 345 includes a port for direct physical connection to a network, such as a network 105 of FIG. 1, or to another communication channel. For example, the communication unit 345 may include a port such as a USB, SD, RJ45, or similar port for wired communication with another computing device. In some implementations, the communication unit 345 includes a wireless transceiver for exchanging data with another computing device or other communication channels using one or more wireless communication methods, including IEEE 802.11, IEEE 802.16, BLUETOOTH® or another suitable wireless communication method.

In some implementations, the communication unit 345 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 345 includes a wired port and a wireless transceiver. The communication unit 345 also provides other conventional connections to a network for distribution of data using standard network protocols including TCP/IP, HTTP, HTTPS and SMTP, etc.

The storage device 341 may be a non-transitory storage medium that stores data for providing the functionality described herein. The storage device 341 may be a dynamic random access memory (DRAM) device, a static random access memory (SRAM) device, flash memory, or some other memory devices. In some implementations, the storage device 341 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 341 is communicatively coupled to the bus 320 via a signal line 342.

In the implementation illustrated in FIG. 3, the aggregation system 131 includes a communication module 302, a disparity module 304, a calibration module 306, and a stitching module 308. These modules of the aggregation system 131 are communicatively coupled to each other via the bus 320.

In some implementations, each module of the aggregation system 131 (e.g., module 302, 304, 306, or 308) may include a respective set of instructions executable by the processor 335 to provide its respective functionality described below. In some implementations, each module of the aggregation system 131 may be stored in the memory 337 of the computing device 300 and may be accessible and executable by the processor 335. Each module of the aggregation system 131 may be adapted for cooperation and communication with the processor 335 and other components of the computing device 300.

The communication module 302 may be software including routines for handling communications between the aggregation system 131 and other components of the computing device 300. The communication module 302 may be communicatively coupled to the bus 320 via a signal line 322. The communication module 302 sends and receives data, via the communication unit 345, to and from one or more of the entities of the system 100 depicted in FIG. 1. For example, the communication module 302 may receive image data from the connection hub 123 via the communication unit 345 and may forward the image data to the disparity module 304, the calibration module 306, and the stitching module 308.

In some implementations, the communication module 302 receives data from components of the aggregation system 131 and stores the data in the memory 337 or the storage device 341. In some implementations, the communication module 302 retrieves data from the memory 337 or the storage device 341 and sends the data to one or more appropriate components of the aggregation system 131. Alternatively or additionally, the communication module 302 may handle communications between components of the aggregation system 131.

The disparity module 304 may be software including routines for estimating a pair of disparity maps between two camera modules 103 in a camera pair. The disparity module 304 may be communicatively coupled to the bus 320 via a signal line 324. For simplicity and convenience of discussion, estimation of the pair of disparity maps is described below with reference to a first camera module 103 (also referred to as "left camera") and a second camera module 103 (also referred to as "right camera") that form the camera pair. The left camera and the right camera in the camera pair may have an overlap field of view.

At a particular time, the left camera may capture a first image for a scene, and the right camera may capture a second image for the scene. The first image may include a first sub-image; the second image may include a second sub-image; and both the first sub-image and the second sub-image may cover at least part of the overlap field of view of the camera pair. For simplicity and convenience of discussion below, the first sub-image may be referred to as "left image," and pixels in the left image may be referred to as "left pixels;" the second sub-image may be referred to as "right image", and pixels in the right image may be referred to as "right pixels." In some implementations, the left image and the right image may cover the entire overlap field of view of the camera pair. Alternatively, the left image and the right image may cover a common portion of the overlap field of view.

Objects within the overlap field of view of the camera pair may be visible to both cameras, and appearances of these objects captured by the camera pair may be determined based on a point of view of the corresponding camera. Appearances of the same object in the left image and the right image may be different, which may be referred to as parallax. Difference in the positions of the same object captured in the left image and the right image may be referred to as disparity.

A pair of disparity maps associated with the camera pair may include a first disparity map from the left camera to the right camera and a second disparity map from the right camera to the left camera. The first disparity map may match disparity of pixels from the left image to the right image and may be referred to as Disparity(L→R). A second disparity map may match disparity of pixels from the right image to the left image and may be referred to as Disparity(R→L). The first disparity map "Disparity(L→R)" and the second disparity map "Disparity(R→L)" may be substantially symmetric and may differ at points of occlusion. Points of occlusion may refer to pixels that are visible to one camera while invisible to another camera because view from the other camera may be blocked by other objects.

The first disparity map "Disparity(L→R)" may store pixel correspondence from the left image to the right image. In some implementations, the first disparity map "Disparity (L→R)" may have the same size as the left image and the right image. For example, the left image and the right image may each include 100×100 pixels, and the first disparity map "Disparity(L→R)" may include 100×100 map locations. At each map location associated with a corresponding left pixel, a disparity vector may be stored and may represent a coordinate offset from a location of the corresponding left pixel to a location of a right pixel that matches the left pixel. For example, a disparity vector (5,−3) may be stored at a map location (10,62), which may indicate that a left pixel at the location (10,62) of the left image corresponds to a right pixel at a location (15,59) of the right image (e.g., (15,59)= (10,62)+(5,−3)).

Similarly, the second disparity map "Disparity(R→L)" may store pixel correspondence from the right image to the left image. In some implementations, the second disparity map "Disparity(R→L)" may have the same size as the left image and the right image. For example, the left image and the right image may each include 100×100 pixels, and the second disparity map "Disparity(R→L)" may include 100× 100 map locations. At each map location associated with a corresponding right pixel, a disparity vector may be stored and may represent a coordinate offset from a location of the corresponding right pixel to a location of a left pixel that may match the right pixel. For example, a disparity vector (−5,3) may be stored at a map location (15,59), which may indicate that a right pixel at the location (15,59) of the right image corresponds to a left pixel at a location (10,62) of the left image (e.g., (10,62)=(15,59)+(−5,3)).

The disparity module 304 may determine disparity vectors stored in the first disparity map "Disparity(L→R)" by performing operations described below. An example method 600 of determining a disparity map is described below with reference to FIGS. 6A-6E.

In some implementations, the left image and the right image may be two rectangular color images. If the left image and the right image are not rectangular, they may also be treated as rectangular arrays by marking pixels outside the rectangular arrays with undefined values.

The disparity module 304 may preprocess the left image to generate a normalized left image. For example, the disparity module 304 may preprocess the left image by performing operations including, but not limited to: (1) converting the left image to luminance to avoid color variation; (2) applying a first band pass filter (e.g., a low pass filter) to filter the left image for limiting high-frequency noise and subpixel shift effects; (3) applying a second band pass filter (e.g., a high pass filter) to filter the left image for countering luminance variation; (4) down-sampling the left image by a down-sample ratio; and (5) normalizing local image power to generate the normalized left image for uniform pixel contributions.

In some implementations, the disparity module 304 may normalize the local image power by performing operations that include, but are not limited to: (1) computing the local image power by using a low-pass filter to filter absolute values of the left image that has passed the first band pass filter and the second band pass filter; and (2) dividing each pixel in the left image by the local image power plus the noise floor. Alternatively, the disparity module 304 may replace a value of each pixel with a new value generated according to the following expression:

$$\text{sign}(v)*(\text{abs}(v) > \text{noise floor}), \quad (1)$$

where "v" may represent the value of the corresponding pixel, and "abs(v)" may represent an absolute value of "v." The expression (1) may be used to generate pixel values "−1," "0," or "1" for pixels in the normalized left image. For example, for a pixel with a positive pixel value which is greater than the noise floor, a new value "1" is generated for the pixel in the normalized left image.

Similarly, the disparity module 304 may preprocess the right image to generate a normalized right image by performing similar operations described above. The preprocessing of the left image and the right image may reduce or eliminate variation caused by illumination and improve robustness of the disparity computation.

The disparity module 304 may select a left pixel from the normalized left image and determine a left image patch from the normalized left image, with the selected left pixel centered on the left image patch. The disparity module 304 may apply a window function to the left image patch to generate a weighted left image patch. The window function may include a two-dimensional (2D) function. For example, the window function may include a 2D Hamming window. A sum of coefficients of the window function may be equal to 1.

The disparity module 304 may determine a search region in the normalized right image for the selected left pixel. The search region may be a rectangular region specified by a left offset, a right offset, an up offset, and a down offset, which may respectively determine four corners of the rectangular region when combined with a location of the left pixel. For example, for a pixel at a location (x,y) with the left offset=−50, the right offset=+10, the down offset=−7, and the up offset=+7, the search region in the normalized right image for the pixel (x,y) may be a rectangular area bounded by (x−50,y−7) and (x+10,y+7). Alternatively, the search region may be another type of 2D search regions (e.g., a curved region). Alternatively, the search region may be reduced to a one-dimensional (1D) search line.

Ideally, the search region may be as small as possible. Assume that an epipolar direction is horizontal. A vertical search in a rectangular search region may allow for miscalibration between cameras or other non-ideality such as lens distortion. Certain types of distortion such as spherical projection and lens distortion may result in predictable distortions of the epipolar lines into curves. In this case, a curved search region may be specified rather than a rectangular search region.

The disparity module 304 may then select a right pixel from the search region and a right image patch from the normalized right image, with the selected right pixel centered on the right image patch. The disparity module 304 may apply the window function to the right image patch to generate a weighted right image patch. The disparity module 304 may generate a preliminary score for the selected left pixel and the selected right pixel based on the weighted left image patch and the weighted right image patch. For example, the disparity module 304 may assess pixel similarity between the selected left pixel and the selected right pixel by: (1) subtracting the weighted left image patch from the weighted right image patch at a pixel level to obtain an array of pixel-by-pixel value differences; and (2) summing absolute values of the pixel-by-pixel value differences in the array to generate a preliminary score for the selected left pixel and the selected right pixel. The preliminary score may be referred to as a sum of absolute differences (SAD). Other types of preliminary scores may be used such as a sum of squared difference (SSD).

The preliminary score may have a value between 0 and 2, because left pixels in the left image and right pixels in the right image are normalized to have a value of −1, 0, or 1 and the window function has coefficients that sum up to 1. A preliminary score with a value of 0 may indicate a perfect match between the selected left pixel and the selected right pixel. A preliminary score with a value of 1 may indicate a random match between the selected left pixel and the selected right pixel. A preliminary score with a value of 2 may indicate an inverted match between the selected left pixel and the selected right pixel.

By performing similar operations, the disparity module 304 may generate a group of preliminary scores for the selected left pixel and a group of right pixels (e.g., all of the right pixels) within the search region, with each preliminary score associated with the selected left pixel and a corresponding right pixel from the group of right pixels.

Matching errors may occur due to occlusions, semi-periodic image patches, featureless surfaces, etc. A larger window function may be used to reduce noise in the preliminary scores, but may result in a lower spatial resolution in the disparity map. Nevertheless, a smaller window function may be used with a combination of additional match tests to identify incorrect or inaccurate matches.

The disparity module 304 may perform a match test on the group of preliminary scores. A match test may include testing whether the group of preliminary scores may satisfy one or more match conditions. For example, a first match condition may indicate that a best preliminary score (e.g., a lowest preliminary score) from the group of preliminary scores may be below a match score threshold (e.g., 0.5 or another value). A satisfaction of the first match condition may indicate a close resemblance between the left image patch and a corresponding right image patch associated with the best preliminary score. A failure to satisfy the first match condition may indicate a weak match for mapping the selected left pixel to a right pixel in the right image due to an occlusion.

A second match condition may indicate an average of the preliminary scores across the entire search region may be above a minimum average value (e.g., 0.9 or another value). A failure to satisfy the second match condition may indicate that the search region may be an ambiguous search region including multiple possible right pixels that may match the selected left pixel.

A third match condition may indicate that a difference between (1) a mean score of the preliminary scores and (2) the best preliminary score may be above a first minimum difference value (e.g., 0.25 or another value). The third match condition may be considered as a combination of the first match condition and the second match condition.

A fourth match condition may indicate that a difference between (1) a preliminary score at a second highest peak in the preliminary scores and (2) the best preliminary score may be above a second minimum difference value (e.g., 0.1 or another value). The fourth match condition may be similar to the second match condition. Other example match conditions are possible.

If the group of preliminary scores does not pass the match test, the disparity module 304 may mark a disparity vector for the selected left pixel as unknown. If the group of preliminary scores has passed the match test, the disparity module 304 may determine a match score from the group of preliminary scores and a right pixel associated with the match score. For example, the disparity module 304 may select the lowest preliminary score as the match score and determine a right pixel associated with the lowest preliminary score. In another example, the disparity module 304 may estimate a match score through quadratic interpolation in a neighborhood of lowest preliminary scores within the group of preliminary scores.

Next, the disparity module 304 may determine a disparity vector for the selected left pixel as an offset between a pixel location of the selected left pixel and a pixel location of the right pixel associated with the match score. If the search region is a 2D search region, the disparity vector may be recorded as a 2D offset vector. If the search region is a 1D search line, the disparity vector may be reduced to an offset value.

By performing similar operations, the disparity module 304 may determine a first group of left pixels from the left image, where corresponding preliminary scores associated with each left pixel in the first group may pass the match test. The disparity module 304 may also generate a first group of disparity vectors for the first group of left pixels. Alternatively or additionally, the disparity module 304 may determine a second group of left pixels from the left image, where corresponding preliminary scores associated with each left pixel in the second group may fail the match test. The disparity module 304 may mark disparity vectors for the second group of left pixels as unknown.

The disparity module 304 may perform one or more consistency checks to each left pixel in the first group of left pixels. The one or more consistency checks may include one or more of the following: (1) if two or more left pixels from the first group of left pixels map to the same right pixel from the right image, then a disparity vector of a left pixel with a worst preliminary score (e.g., a highest preliminary score) among the two or more left pixels may be marked as unknown; (2) if a left pixel in the first group of left pixels maps to a right pixel in the right image but the right pixel in the right image does not map back to the same left pixel, then a disparity vector for the left pixel may be marked as unknown; and (3) if a left pixel in the first group of left pixels maps to a right pixel in the right image but pixel color of the left pixel differs significantly from that of the right pixel, then a disparity vector for the left pixel may be marked as unknown.

In some implementations, there may be an overlap field of view between three cameras that may form a trinocular stereo. The three cameras may form a first camera pair that includes a first camera and a second camera and a second camera pair that includes the second camera and a third camera. The second camera may be equally spaced between the first camera and the third camera. The one or more consistency checks described above may be applied to the first camera pair and the second camera pair. The one or more consistency checks may additionally include checking whether pixels captured by the second camera may have consistent disparities to pixels captured by the first camera and pixels captured by the third camera.

The disparity module 304 may determine, from the first group of left pixels, (1) a first sub-group of left pixels that pass the one or more consistency checks and (2) a second sub-group of left pixels that fail at least one of the one or more consistency checks. The first sub-group of left pixels may be associated with a first sub-group of disparity vectors from the first group of disparity vectors. The disparity module 304 may mark the second sub-group of left pixels with unknown disparity vectors.

The disparity module 304 may estimate a disparity vector for each left pixel marked with an unknown disparity vector using one or more estimation mechanisms described below. For example, the disparity module 304 may estimate a second sub-group of disparity vectors for the second sub-group of left pixels that fail the one or more consistency checks. The disparity module 304 may also estimate a second group of disparity vectors for the second group of left pixels that fail the match test.

A first estimation mechanism may include iterating disparity map estimation with varied spatial scales, varied window functions, or both. For example, if more than one combination of band pass filters, down-sampling ratios, and noise floors is specified, an initial round of disparity map estimation may include using a finest spatial scale to generate an initial disparity map "Disparity(L→R)." A second round of disparity map estimation may include using a next spatial scale larger than the finest spatial scale to generate a second disparity map "Disparity(L→R)." If the second disparity map "Disparity(L→R)" includes disparity vectors for left pixels, which pass both the match test and the one or more consistency checks in the second round but fail at least one of the match test and the one or more consistency checks in the initial round, then the disparity vectors for the left pixels obtained in the second round may propagate to the initial disparity map "Disparity(L→R)" to replace the unknown disparity vectors marked for the left pixels in the initial round. The disparity map estimation may be iterated with progressively coarser spatial scales for a number of rounds to fill in disparity vectors for left pixels marked with unknown disparity vectors in the initial round.

Alternatively or additionally, if more than one window function is specified, an initial round of disparity map estimation may include using a smallest window function to generate an initial disparity map "Disparity(L→R)." A second round of disparity map estimation may include using a next window function larger than the smallest window function to generate a second disparity map "Disparity (L→R)." If the second disparity map "Disparity(L→R)" includes disparity vectors for left pixels, which pass both the match test and the one or more consistency checks in the second round but fail at least one of the match test and the one or more consistency checks in the initial round, then the disparity vectors for the left pixels obtained in the second round may propagate to the initial disparity map "Disparity (L→R)" to replace the unknown disparity vectors marked for the left pixels in the initial round. The disparity map estimation may be iterated with progressively larger window functions for a number of rounds to fill in disparity vectors for left pixels marked with unknown disparity vectors in the initial round.

A second estimation mechanism may include filling in disparity vectors for left pixels marked with unknown disparity vectors through vertical and horizontal search on nearby disparity vectors. For example, assume that left pixels marked with unknown disparity vectors are more likely to be background pixels and thus have the smallest disparities. For a left pixel with an unknown disparity vector, the disparity module 304 may search vertically and horizontally for the closest known disparity vectors and fill the left pixel with a shortest disparity vector among the known disparity vectors.

A third estimation mechanism may include filling in disparity vectors for left pixels marked with unknown disparity vectors through nearby left pixels with a similar color. For example, assume that objects may have limited color palettes and spatial extents. For a left pixel with an unknown disparity vector, the disparity module 304 may fill the left pixel with a disparity vector based on nearby left pixels with known disparity vectors to minimize a weighted combination of color difference and distance. The third estimation mechanism may also be applicable for occlusions that are entirely surrounded by a foreground object. Other example estimation mechanisms are possible.

The disparity module 304 may generate the disparity map "Disparity(L→R)" that maps the left image to the right image on a pixel-by-pixel level. For example, the disparity map "Disparity(L→R)" may include an array that includes the first sub-group of disparity vectors for the first sub-group of left pixels, the second sub-group of disparity vectors for the second sub-group of left pixels, and the second group of disparity vectors for the second group of left pixels. A map location in the disparity map "Disparity(L→R)" may store a disparity vector and a state of the map location. The state of the map location may include one of a close match state (e.g., a match is found between the left image and the right image at this pixel location), an estimated match state (e.g., no match is found between the left image and the right image at this pixel location but a match is estimated from neighboring matches), or an undefined state (e.g., no match was determined because this left pixel in the left image is undefined). If the state of the map location is undefined, the disparity vector for this map location may also be undefined.

Figure 9:
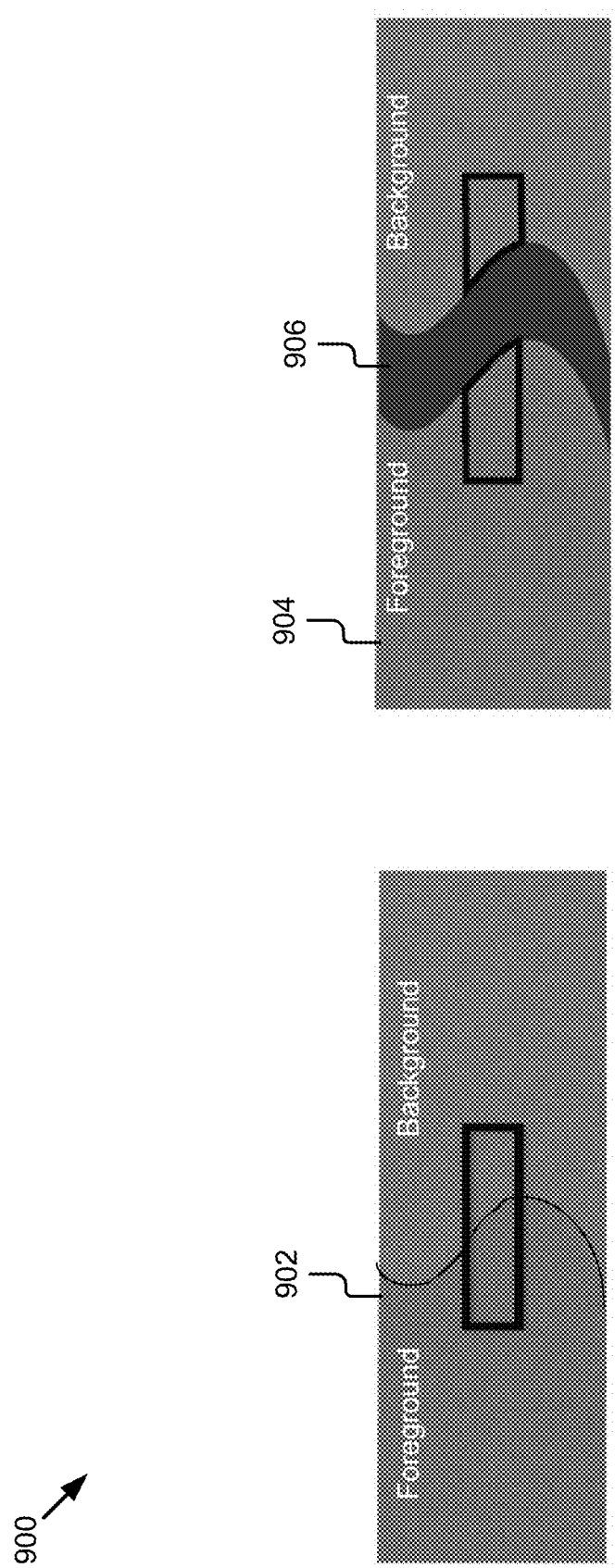
FIG. 9 is a graphic representation that illustrates an example boundary refinement at image areas of discontinuous disparity changes according to some implementations.

In some implementations, the disparity module 304 may perform boundary refinement at or near image areas with discontinuous disparity changes. For example, areas with significant disparity change may result in overshoot or undershoot of foreground object boundaries because areas near the boundary may span occluded areas in one image but not in the other image. The disparity module 304 may estimate an occlusion width from differences in foreground disparity and background disparity, and may directly model match between the left image and the right image by leaving out a gap with the occlusion width that spans the occlusion. An example of boundary refinement is illustrated in FIG. 9.

From the above discussion, the disparity module 304 may generate the disparity map "Disparity(L→R)" that maps the left image to the right image. Similarly, the disparity module 304 may generate the disparity map "Disparity(R→L)" by performing operations similar to those described above. As a result, a pair of disparity maps that includes the disparity map "Disparity(L→R)" and the disparity map "Disparity (R→L)" may be generated for the camera pair that includes the left camera and the right camera.

The calibration module 306 may be software including routines for estimating calibration parameters and calibrating images captured by the camera modules 103 in the camera array 101. The calibration module 306 may be coupled to the bus 320 via a signal line 326.

In some implementations, the calibration module 306 may estimate a set of calibration parameters for the camera array 101. For example, given a set of videos captured by the camera array 101 and an ideal geometry of the camera array 101, the calibration module 306 may estimate a set of calibration parameters that may be used to adjust images captured by the camera array 101 to satisfy one or more calibration constraints. The one or more calibration constraints may include, but are not limited to: (1) pixel matches between any two images may be along an epipolar line that separates the camera centers; and (2) in a region of an image that overlaps with two other neighboring images, measured disparities are consistent given the camera array geometry (e.g., disparities are equal if the camera modules 103 are equally spaced).

Alternatively or additionally, the calibration module 306 may use reprojection errors to estimate the set of calibration parameters. For example, given the camera geometry, corresponding pixels between two camera modules 103 may be triangulated to a particular point in the 3D space. The particular point in the 3D space may then be reprojected back to a reprojected location on an original camera image plane. A reprojection error may be determined as a difference between the reprojected location and an originally observed location.

In some implementations, the calibration module 306 may instruct the disparity module 304 to generate disparity maps for all pairs of overlapped images. The search region may be configured to accommodate possible deviations from ideal camera array geometry, which assumes that an actual camera array geometry is close enough to the ideal camera array geometry such that image patches are virtually identical in scale and rotation. The disparity maps may only include disparity vectors from close matches and may not include disparity vectors from non-close matches. A close match from a pixel in a first image to a pixel in a second image may indicate a match that passes the match test and the one or more consistency checks. A non-close match from a pixel in the first image to a pixel in the second image may indicate a match that fails at least one of the match test and the one or more consistency checks and is estimated using the one or more estimation mechanisms. Multiple video frames may be sampled to generate multiple copies of the disparity maps. The multiple copies of the disparity maps may be combined to make the matching estimates more robust against false positives and to increase coverage of close matches.

The calibration module 306 may compute the set of calibration parameters by confining each camera module 103 to satisfy the one or more calibration constraints, which may be used to perform global optimization to minimize a total deviation from the one or more calibration constraints across all the camera modules 103. The set of calibration parameters may be parameterized with low-dimensional models (e.g., camera rotation and translation, or a projective transform). Since the low-dimensional models may be insufficient to achieve accurate calibration in pixel level across an entire image due to complex factors such as lens distortion, the low-dimensional models may be supplemented with vector displacement maps that may be used to distort the images.

In some implementations, the calibration module 306 may receive a group of images captured by the camera modules 103 in the camera array 101 at a particular time. The calibration module 306 may calibrate the group of images using the set of calibration parameters so that the group of images after calibration may satisfy the one or more calibration constraints. The calibration module 306 may send the group of images to the stitching module 308.

The stitching module 308 may be software including routines for stitching images to form a left panoramic image for left eye viewing and a right panoramic image for right eye viewing. The stitching module 308 may be coupled to the bus 320 via a signal line 380. In some implementations, the stitching module 308 may receive a group of images from the calibration module 306. The stitching module 308 may apply morphed rendering to create morphed images from the group of images as described below.

For each camera pair that includes a first camera module 103 configured to capture a first image in the group of images and a second camera module 103 configured to capture a second image in the group of images, the stitching module 308 may instruct the disparity module 304 to generate a pair of disparity maps associated with the first image and the second image. For example, the first image and the second image may overlap in an overlap field of view of the camera pair. The first image may include a first sub-image and the second image may include a second sub-image, where the first sub-image and the second sub-image may cover at least one portion of the overlap field of view of the camera pair. The stitching module 308 may instruct the disparity module 304 to generate a first disparity map that maps the first sub-image to the second sub-image and a second disparity map that maps the second sub-image to the first sub-image. Since the first image and the second image are post-calibration images, a search region used to generate the pair of disparity maps may be configured as a line in the epipolar direction.

The stitching module 308 may apply morphed rendering to create a morphed image that covers the at least one portion of the overlap field of view of the camera pair. The morphed image may represent different slit views of a slit camera that moves from the first camera module 103 to the second camera module 103 in the camera pair. Each slit view may correspond to a set of pixels (e.g., one or more columns of pixels) in the morphed image. In some implementations, the stitching module 308 may determine view positions for multiple slit views between the first camera module 103 and the second camera module 103, generate multiple sets of pixels for the multiple slit views from the first sub-image and the second sub-image, and combine the multiple sets of pixels to form a morphed image.

For each slit view, the stitching module 308 may generate a set of pixels for the slit view from the first sub-image and the second sub-image based on a corresponding view position of the slit view, the first disparity map, and the second disparity map. For example, a view position of the slit camera relative to the first camera module 103 and the second camera module 103 may be determined by a scalar α with a value between 0 and 1, where α=0 indicates that the slit camera co-locates with the first camera module 103 and α=1 indicates that the slit camera co-locates with the second camera module 103. As the slit camera moves from the first camera module 103 to the second camera module 103, the scalar α may change from 0 to 1.

For a view position associated with α, the stitching module 308 may perform operations including: (1) scaling disparity vectors stored in the first disparity map by the scalar α; (2) shifting pixels in the first sub-image by their respective scaled disparity vectors from the first disparity map to generate a first shifted image; (3) scaling disparity vectors stored in the second disparity map by a scalar 1−α; (4) shifting pixels in the second sub-image by their respective scaled disparity vectors from the second disparity map to generate a second shifted image; (5) combining the first shifted image and the second shifted image in a pixel level to generate a combined image (e.g., making an average over corresponding pixel values or taking a maximum value of the corresponding pixel values from the first and second shifted images); and (6) obtaining the set of pixels (e.g., one or more columns of pixels) for the slit view as corresponding pixels from the combined image at the view position associated with α.

For α=0 indicating that the slit camera co-locates with the first camera module 103, the first sub-image may not be shifted and the second sub-image may be shifted to become the first sub-image. A slit view at a view position associated with α=0 is equivalent to a view of the first camera module 103 at the view position. Similarly, for α=1 indicating that the slit camera co-locates with the second camera module 103, the first sub-image may be shifted to become the second sub-image and the second sub-image may not be shifted. A slit view at a view position associated with α=1 is equivalent to a view of the second camera module 103 at the view position. For 0<α<1 indicating that the slit camera is between the first camera module 103 and the second camera module 103, both the first sub-image and the second sub-image may be shifted and then combined to create a slit view that is a blending of (1) a view of the first camera module 103 at the view position and a view of the second camera module 103 at the view position.

In some implementations, one or more pixels may be skipped during the morphed rendering due to algorithmic errors or revealed occlusions. The one or more skipped pixels may be filled in using linear filtering, median filtering, repeating or mirroring background pixels if the one or more skipped pixels may be associated with an occlusion, extracting background from temporally proximal video frames or from an entire video sequence, or another suitable pixel filling technique to fill in the missing pixels.

By performing similar operations, the stitching module 308 may create morphed images from the group of images and may stitch the morphed images to form a left panoramic image and a right panoramic image. In some implementations, the stitching module 308 may generate a stream of 3D video data that may describe a stereoscopic panorama of a scene that may vary over time. The stream of 3D video data may include a stream of left panoramic images for left eye viewing and a stream of right panoramic images for right eye viewing. The stream of left panoramic images may be synchronized with the stream of right panoramic images.

Figure 4A:
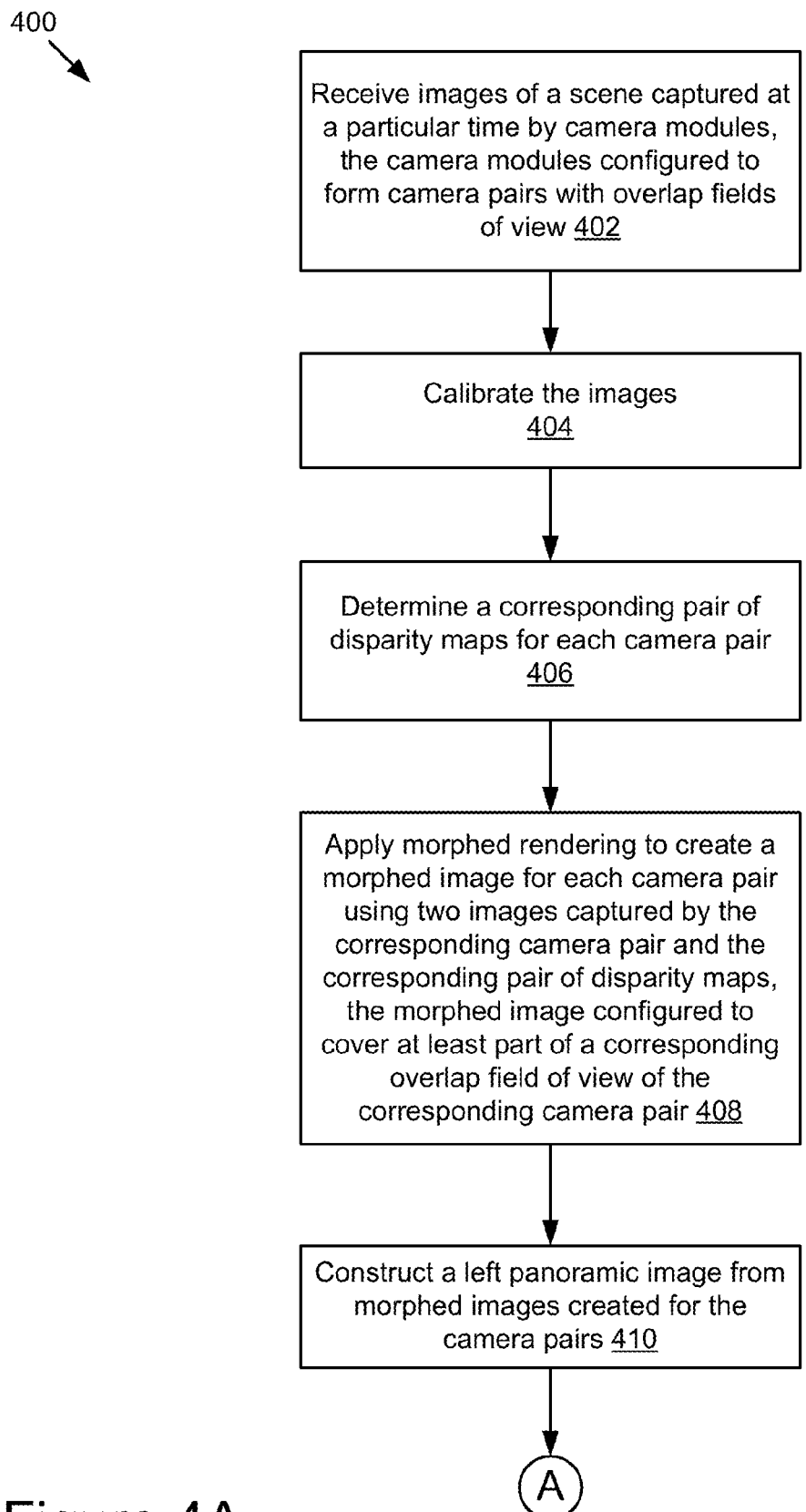
FIGS. 4A and 4B illustrate an example method for stitching images captured at a particular time to generate a left panoramic image and a right panoramic image for the particular time according to some implementations.
Figure 4B:
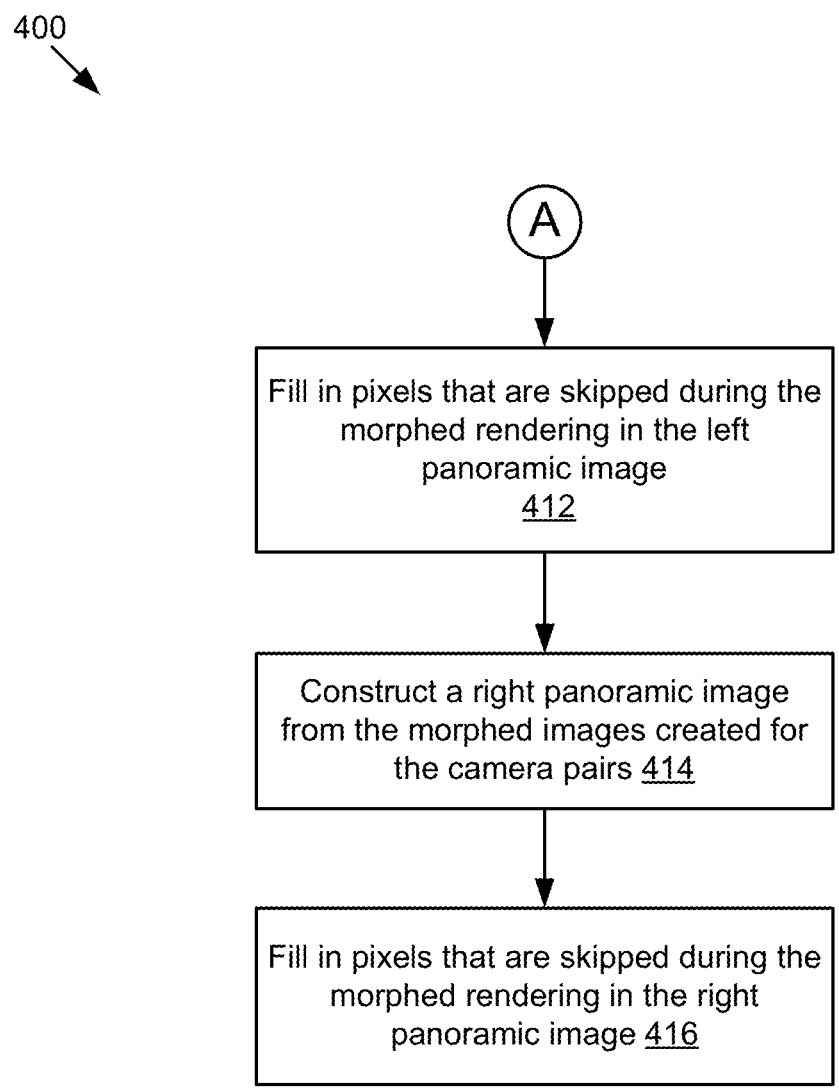

FIGS. 4A and 4B illustrate an example method 400 for stitching images captured at a particular time to generate a left panoramic image and a right panoramic image for the particular time according to some implementations. The method 400 is described with respect to FIGS. 1 and 3. Although illustrated as discrete blocks, various blocks may be divided into additional blocks, combined into fewer blocks, or eliminated, depending on the desired implementation.

Referring to FIG. 4A, the communication module 302 may receive 402 images of a scene captured at a particular time by the camera modules 103 of the camera array 101. The camera modules 103 may be configured to form camera pairs with overlap fields of view. The calibration module 306 may calibrate 404 the images. The disparity module 304 may determine 406 a corresponding pair of disparity maps associated with each camera pair. The stitching module 308 may apply 408 morphed rendering to create a morphed image for each camera pair using two of the images captured by the corresponding camera pair and the corresponding pair of disparity maps. The morphed image may cover at least part of a corresponding overlap field of view of the corresponding camera pair. The stitching module 308 may generate morphed images for all the camera pairs. The stitching module 308 may construct 410 a left panoramic image from the morphed images created for the camera pairs.

Referring to FIG. 4B, the stitching module 308 may fill 412 in pixels that may be skipped during the morphed rendering in the left panoramic image. The stitching module 308 may construct 414 a right panoramic image from the morphed images created for the camera pairs. The stitching module 308 may fill 416 in pixels that may be skipped during the morphed rendering in the right panoramic image.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

Figure 5A:
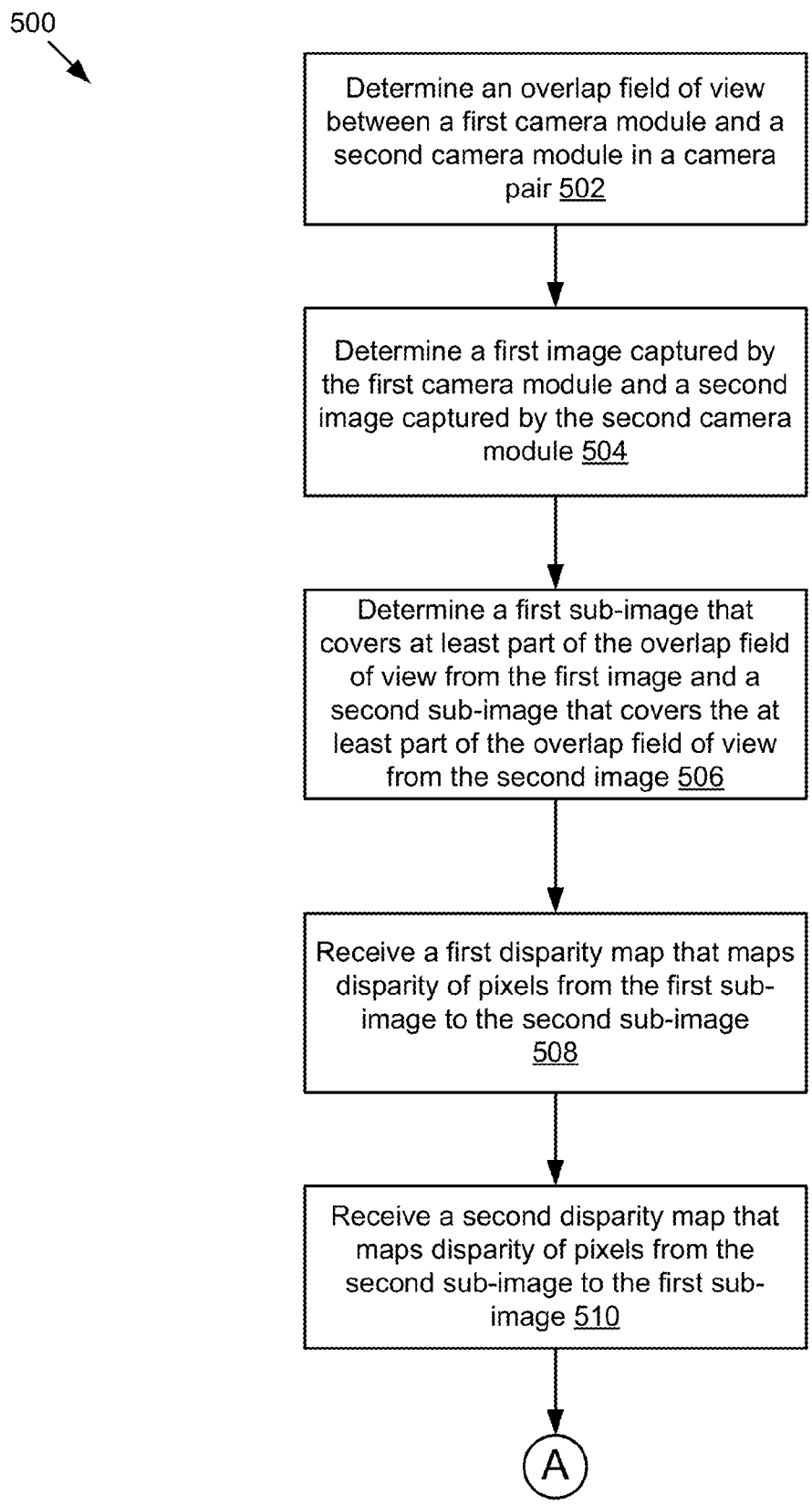
FIGS. 5A and 5B illustrate an example method for creating a morphed image according to some implementations.
Figure 5B:
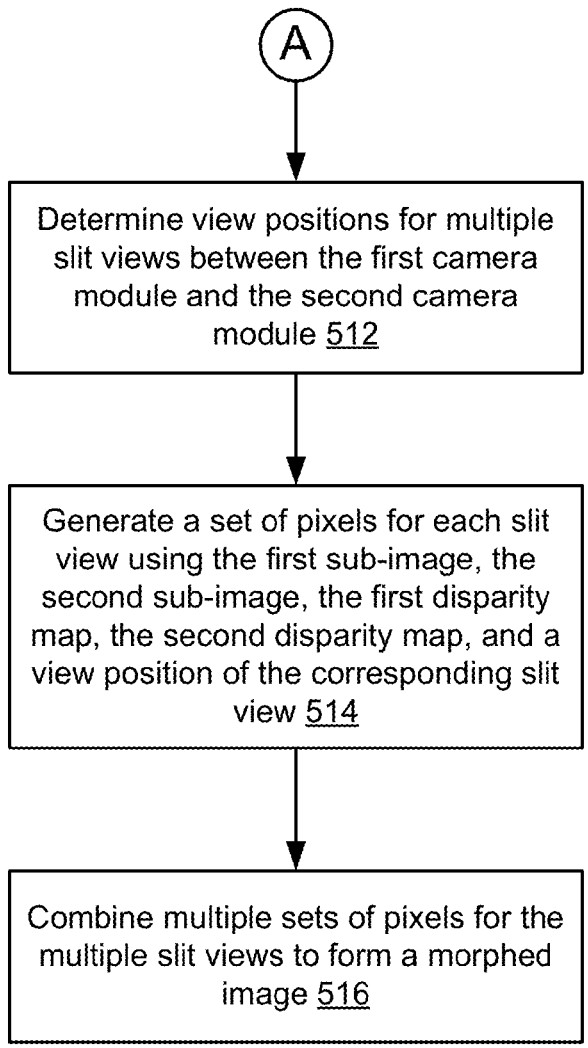

FIGS. 5A and 5B illustrate an example method 500 for creating a morphed image according to some implementations. The method 500 is described with respect to FIGS. 1 and 3. Although illustrated as discrete blocks, various blocks may be divided into additional blocks, combined into fewer blocks, or eliminated, depending on the desired implementation.

Referring to FIG. 5A, the stitching module 308 may determine 502 an overlap field of view between a first camera module 103 and a second camera module 103 in a camera pair. The stitching module 308 may determine 504 a first image captured by the first camera module 103 and a second image captured by the second camera module 103. The stitching module 308 may determine 506: (1) a first sub-image that covers at least part of the overlap field of view from the first image; and (2) a second sub-image that covers the at least part of the overlap field of view from the second image. The stitching module 308 may receive 508 a first disparity map that maps disparity of pixels from the first sub-image to the second sub-image from the disparity module 304. The stitching module 308 may receive 510 a second disparity map that maps disparity of pixels from the second sub-image to the first sub-image from the disparity module 304.

Referring to FIG. 5B, the stitching module 308 may determine 512 view positions for multiple slit views between the first camera module 103 and the second camera module 103. The stitching module 308 may generate 514 a set of pixels for each slit view using the first sub-image, the second sub-image, the first disparity map, the second disparity map, and a view position of the corresponding slit view, so that multiple sets of pixels may be generated for the multiple slit views. The stitching module 308 may combine 516 the multiple sets of pixels for the multiple slit views to form a morphed image.

FIGS. 6A-6E illustrate an example method 600 for estimating a disparity map that maps disparity of pixels from a first sub-image of a first camera module 103 to a second sub-image of a second camera module 103 according to some implementations. The method 600 is described with respect to FIGS. 1 and 3. Although illustrated as discrete blocks, various blocks may be divided into additional blocks, combined into fewer blocks, or eliminated, depending on the desired implementation.

Figure 6A:
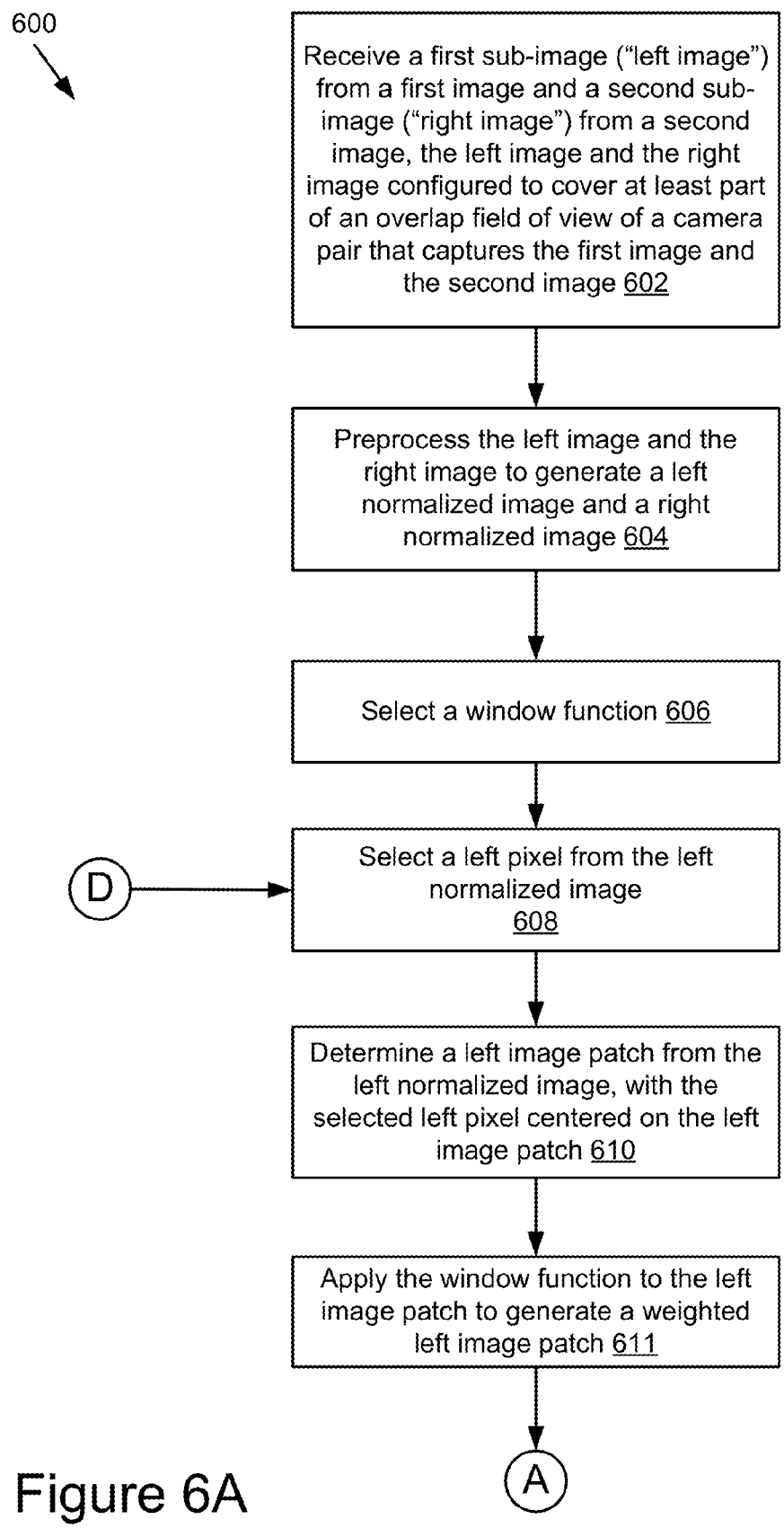
FIGS. 6A-6E illustrate an example method for estimating a disparity map that maps disparity of pixels from a first sub-image captured by a first camera module to a second sub-image captured by a second camera module according to some implementations.

Referring to FIG. 6A, the disparity module 304 may receive a first image captured by a first camera module 103 in a camera pair and a second image captured by a second camera module 103 in the camera pair. The disparity module 304 may determine 602 a first sub-image from the first image and a second sub-image from the second image, where the first sub-image and the second sub-image may cover at least part of an overlap field of view of the camera pair. For convenience of the following discussion in FIGS. 6A-6E, the first sub-image and the second sub-image may be referred to as "left image" and "right image," respectively.

The disparity module 304 may preprocess 604 the left image and the right image to generate a normalized left image and a normalized right image, respectively. The disparity module 304 may select 606 a window function. The disparity module 304 may select 608 a left pixel from the normalized left image. The disparity module 304 may determine 610 a left image patch from the normalized left image, with the selected left pixel centered on the left image patch. The disparity module 304 may apply 611 the window function to the left image patch to generate a weighted left image patch.

Figure 6B:
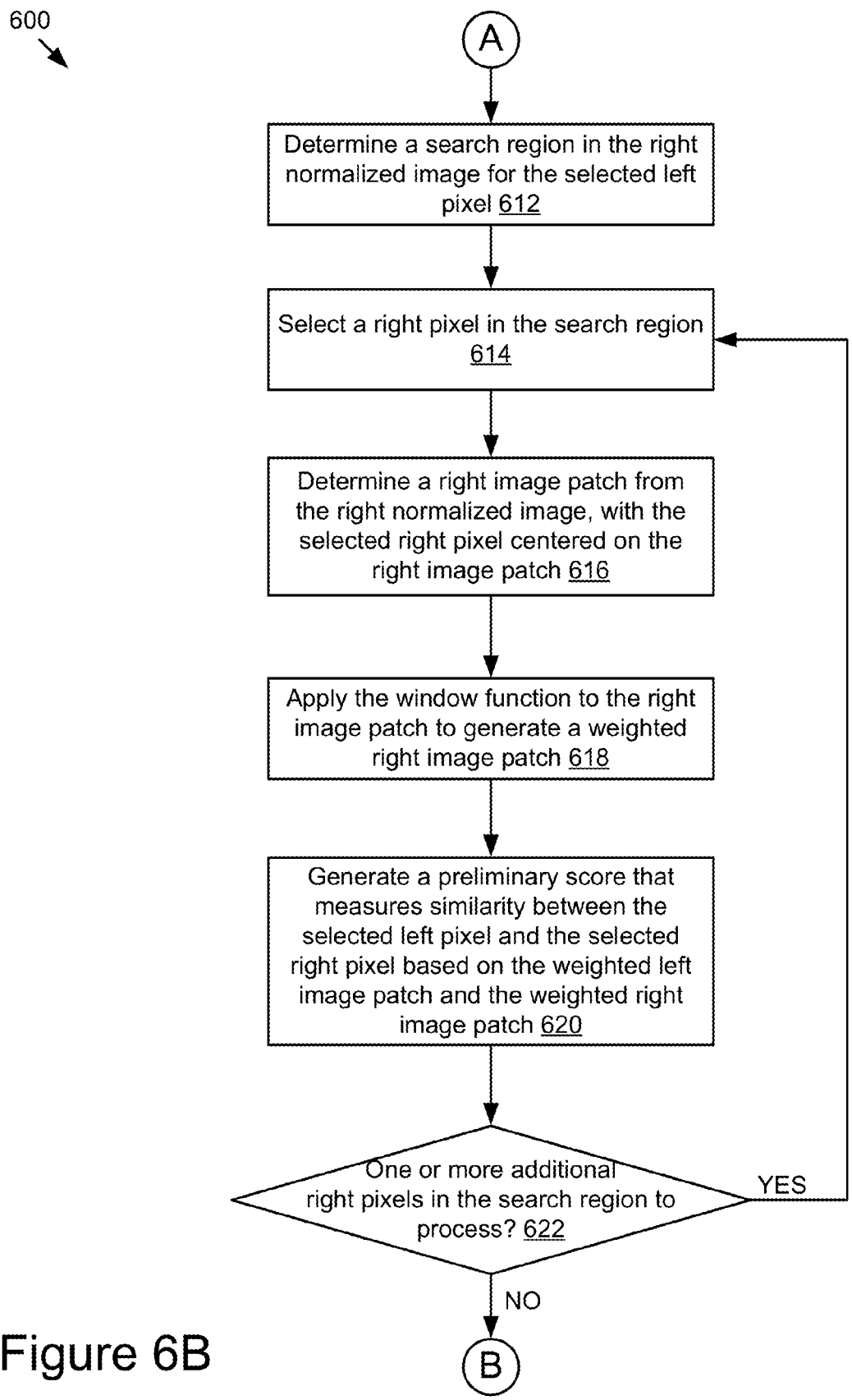

Referring to FIG. 6B, the disparity module 304 may determine 612 a search region in the normalized right image for the selected left pixel. The disparity module 304 may select 614 a right pixel in the search region. The disparity module 304 may determine 616 a right image patch from the normalized right image, with the selected right pixel centered on the right image patch. The disparity module 304 may apply 618 the window function to the right image patch to generate a weighted right image patch. The disparity module 304 may generate 620 a preliminary score for the selected left pixel based on the weighted left image patch and the weighted right image patch. The preliminary score may measure similarity between the selected left pixel and the selected right pixel. The disparity module 304 may determine 622 whether there are one or more additional right pixels in the search region to process. If there is at least one additional right pixel to process, the method 600 may return to block 614. By repeating operations on blocks 614, 616, 618, 620, and 622, the disparity module 304 may generate preliminary scores for the selected left pixel that measure similarity between the selected left pixel and right pixels within the search region. If there is no additional right pixel in the search region to process, the method 600 may proceed to block 624 of FIG. 6C.

Figure 6C:
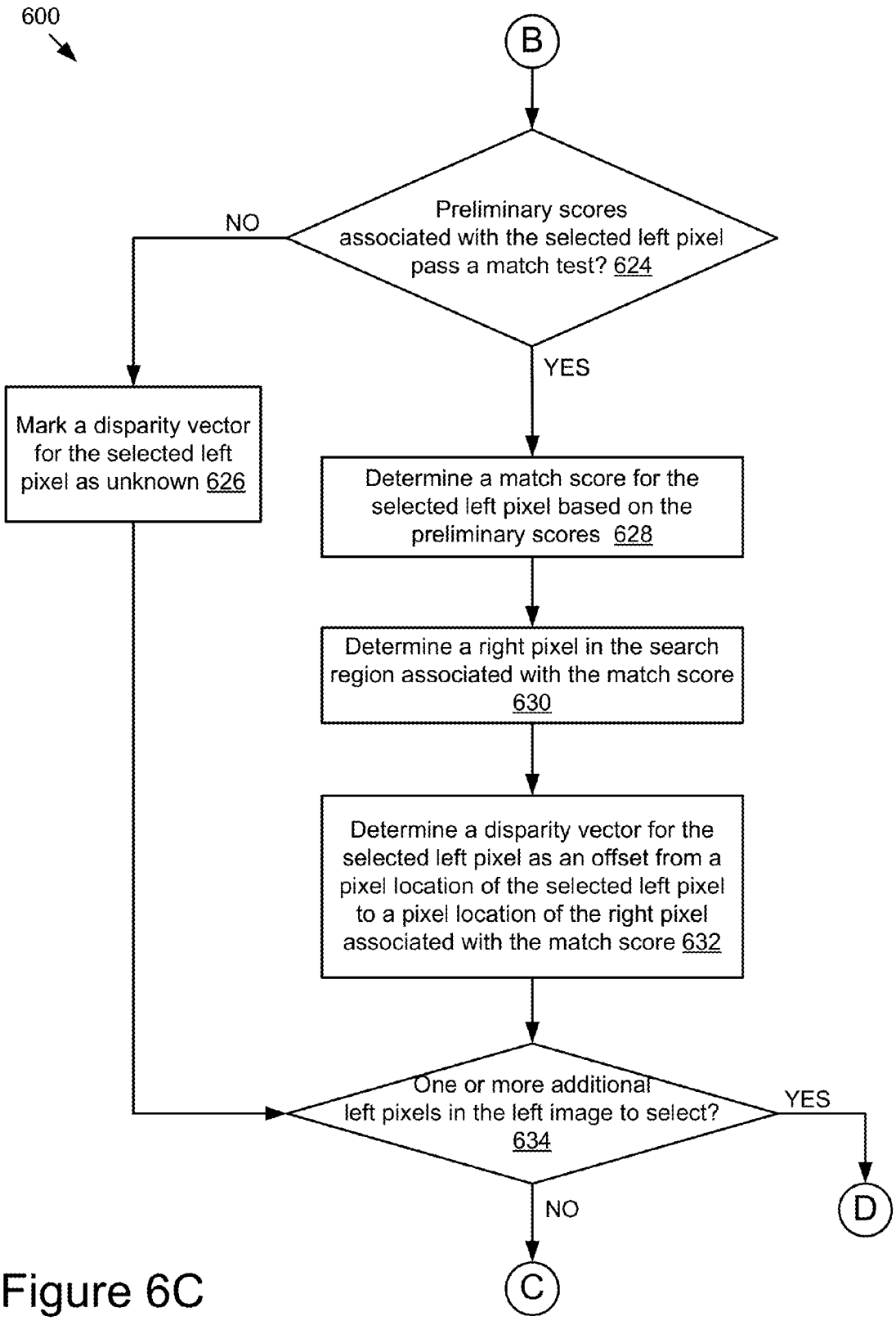

Referring to FIG. 6C, the disparity module 304 may perform a match test on the preliminary scores, and may determine 624 whether the preliminary scores pass the match test. If the preliminary scores pass the match test, the method 600 may proceed to block 628. Otherwise, the method 600 may proceed to block 626. At block 626, the disparity module 304 may mark a disparity vector for the selected left pixel as unknown and the method 600 may proceed to block 634.

At block 628, the disparity module 304 may determine a match score for the selected left pixel based on the preliminary scores. The disparity module 304 may determine 630 a right pixel in the search region associated with the match score. The disparity module 304 may determine 632 a disparity vector for the selected left pixel as an offset from a pixel location of the selected left pixel to a pixel location of the right pixel associated with the match score. The disparity module 304 may determine 634 whether there are one or more additional left pixels in the left image to process. If there is at least one additional left pixel in the left image to process, the method 600 may return to block 608 of FIG. 6A. By repeating operations on blocks 608, 610, 611, 612, 614, 616, 618, 620, 622, 624, 626, 628, 630, 632, and 634, the disparity module 304 may determine a first group of disparity vectors for a first group of left pixels.

Figure 6D:
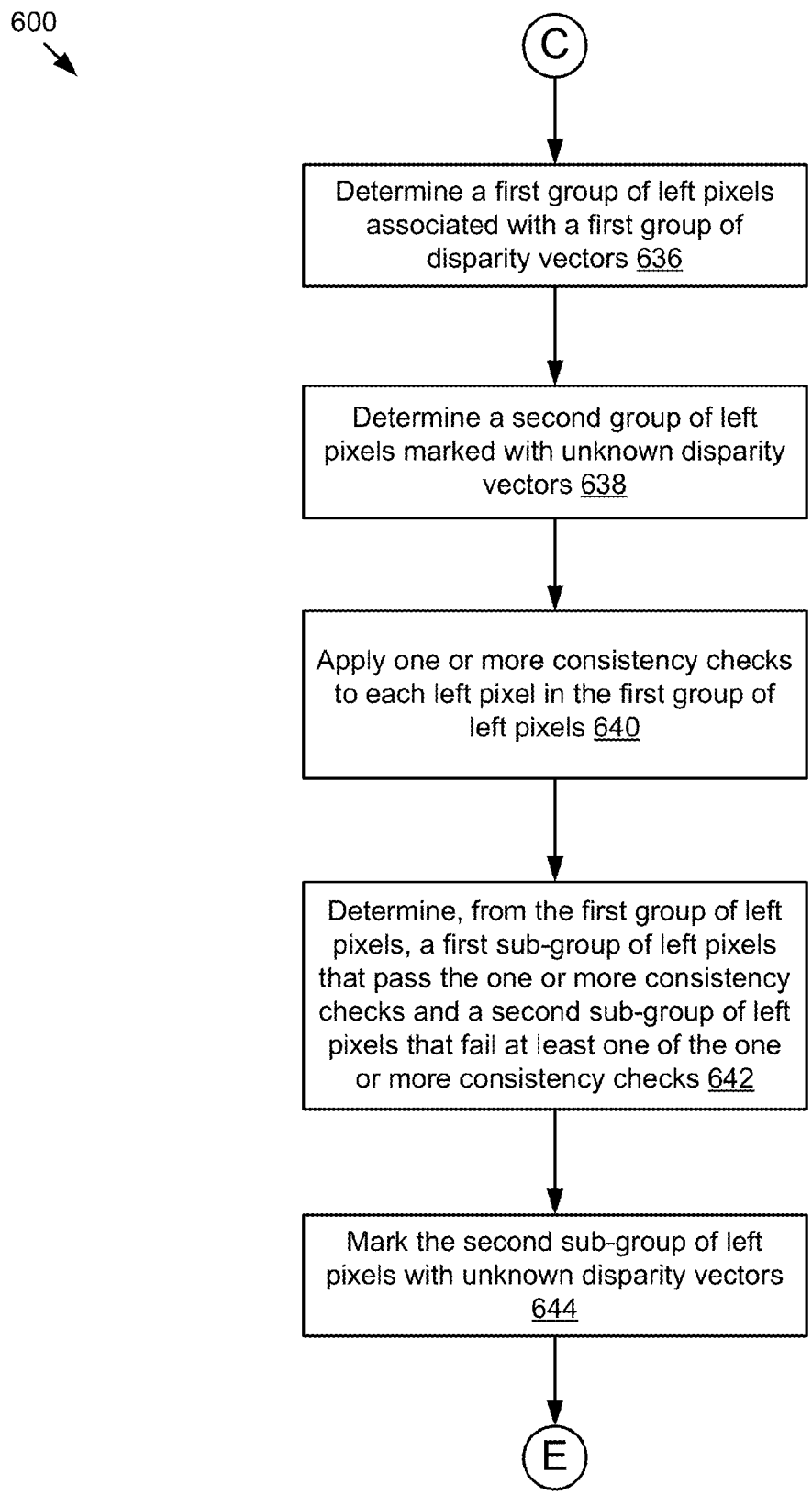

Referring to FIG. 6D, the disparity module 304 may determine 636 the first group of left pixels associated with the first group of disparity vectors. The disparity module 304 may determine 638 a second group of left pixels marked with unknown disparity vectors. Each left pixel in the second group of left pixels may be associated with preliminary scores that fail the match test.

The disparity module 304 may apply 640 one or more consistency checks to each left pixel in the first group of left pixels. The disparity module 304 may determine 642, from the first group of left pixels, a first sub-group of left pixels that pass the one or more consistency checks and a second sub-group of left pixels that fail at least one of the one or more consistency checks. The disparity module 304 may mark 644 the second sub-group of left pixels with unknown disparity vectors.

Figure 6E:
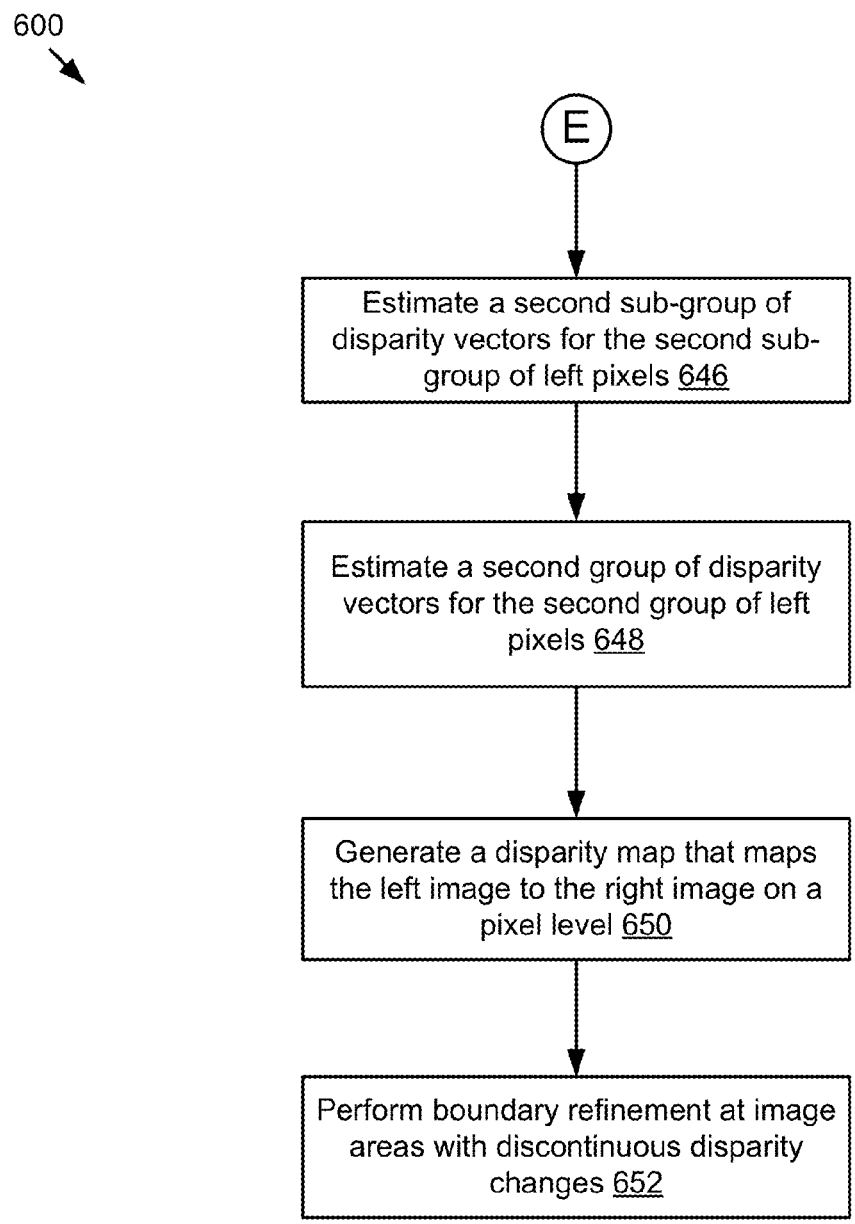

Referring to FIG. 6E, the disparity module 304 may estimate 646 a second sub-group of disparity vectors for the second sub-group of left pixels. The disparity module 304 may estimate 648 a second group of disparity vectors for the second group of left pixels. The disparity module 304 may generate 650 a disparity map that maps the left image to the right image on a pixel level. The disparity map may include the first sub-group of disparity vectors for the first sub-group of left pixels, the second sub-group of disparity vectors for the second sub-group of left pixels, and the second group of disparity vectors for the second group of left pixels. The disparity module 304 may perform 652 boundary refinement at image areas with discontinuous disparity changes.

Figure 7A:
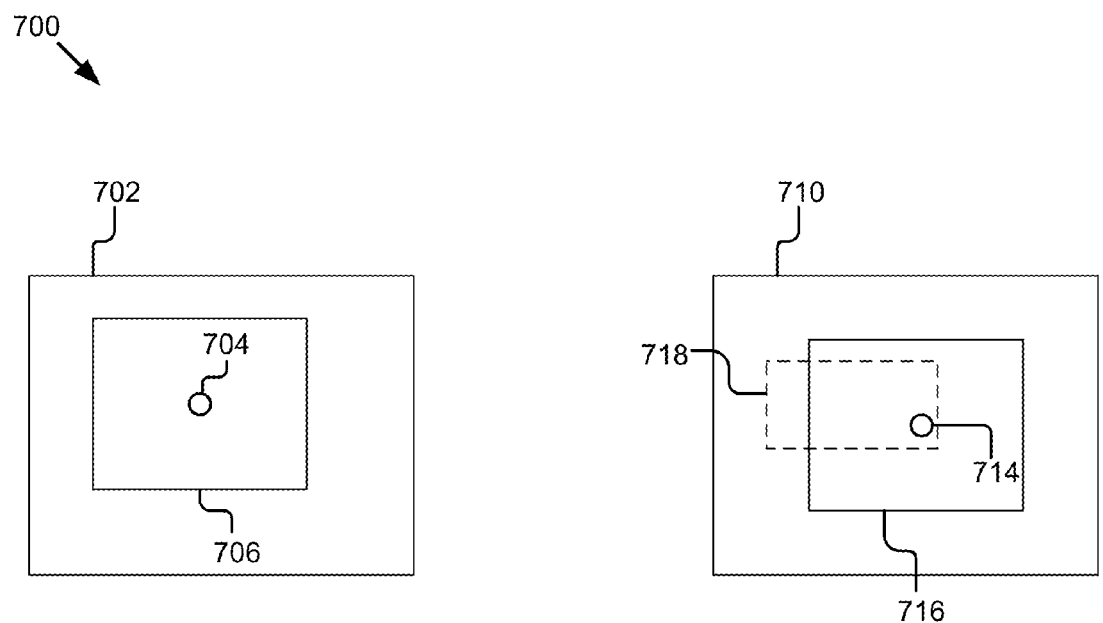
FIGS. 7A and 7B are graphic representations that illustrate image patches in a first sub-image and a second sub-image for determining preliminary scores according to some implementations.
Figure 7B:
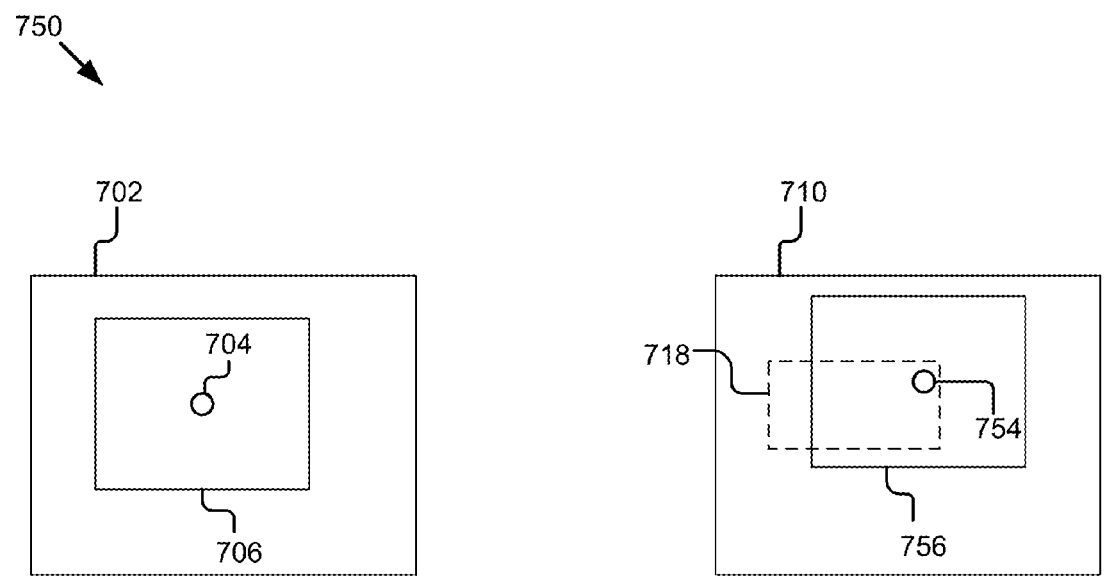

FIGS. 7A and 7B are graphic representations 700 and 750 that illustrate image patches in a left image 702 and a right image 710 for determining preliminary scores according to some implementations. Referring to FIG. 7A, the left image 702 may include a left pixel 704. A left image patch 706 may be determined for the left pixel 704, with the left pixel 704 centered on the left image patch 706. A search region 718 may be determined in the right image 710 for the left pixel 704. If a right pixel 714 in the search region 718 is selected to compute a preliminary score for the left pixel 704, a right image patch 716 may be selected with the right pixel 714 centered on the right image patch 716. The left image patch 706 may be compared to the right image patch 716 to compute the preliminary score for the left pixel 704 and the right pixel 714.

Referring to FIG. 7B, a right pixel 754 in the search region 718 is selected to compute another preliminary score for the left pixel 704. A right image patch 756 may be selected with the right pixel 754 centered on the right image patch 756. The left image patch 706 may be compared to the right image patch 756 to compute the preliminary score for the left pixel 704 and the right pixel 754.

Figure 8:
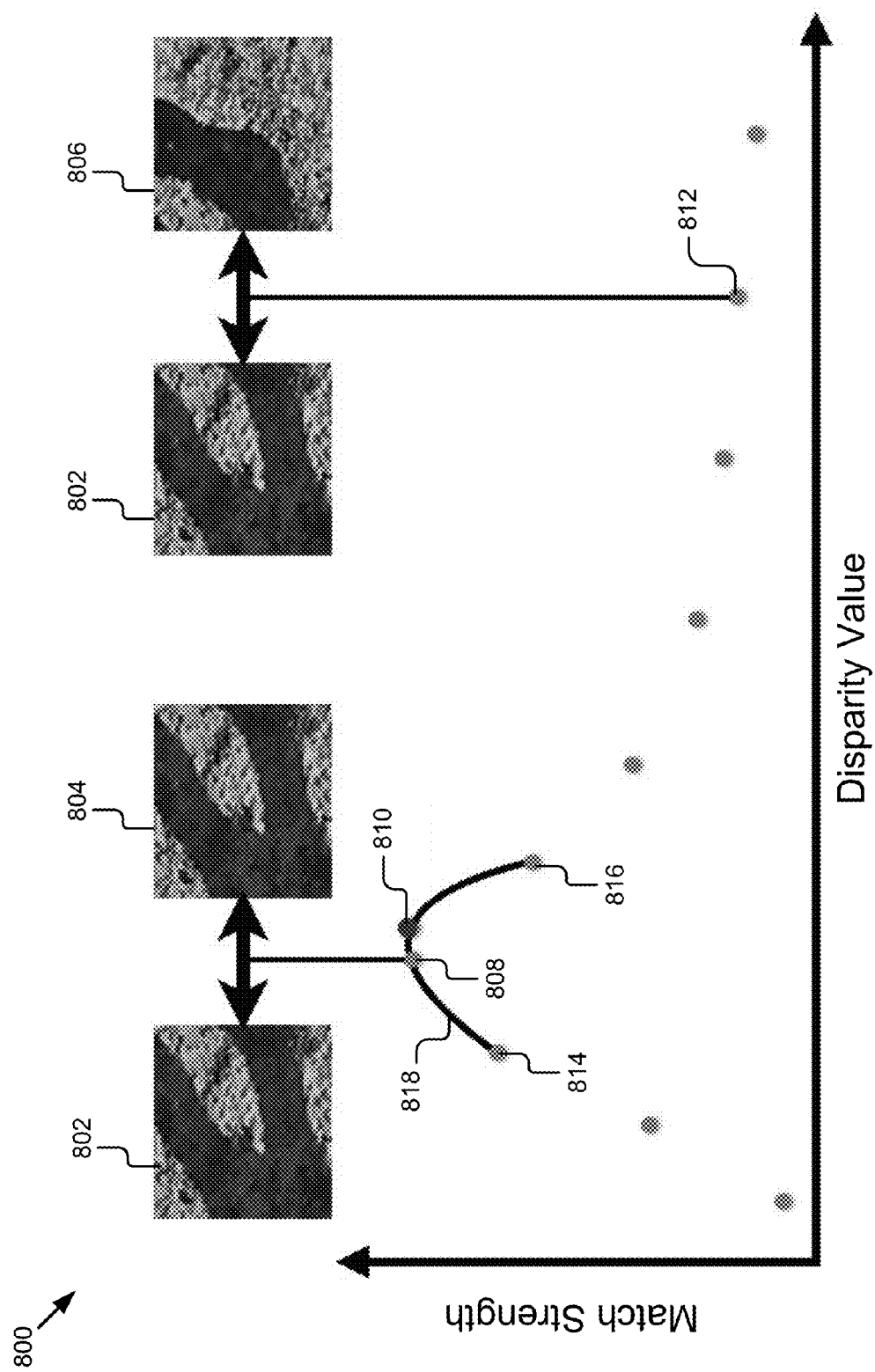
FIG. 8 is a graphic representation that illustrates use of quadratic interpolation to estimate a disparity value for a pixel according to some implementations.

FIG. 8 is a graphic representation 800 that illustrates use of quadratic interpolation to estimate a disparity value for a pixel according to some implementations. After calibration of images captured by the camera array 101, a search region may be reduced from a 2D region to a line along the epipolar direction, and thus a disparity vector may be reduced to a disparity value. A match strength illustrated in FIG. 8 may be inversely related to a preliminary score. For example, a lower preliminary score may indicate a higher match strength.

A left image patch 802 may be determined for a left pixel in a left image. A first right pixel may be selected for the left pixel from a right image, and a right image patch 804 for the first right pixel may be determined in the right image. A first disparity value may be determined as an offset from the left pixel to the first right pixel. The left image patch 802 may be compared to the right image patch 804 to determine a first match strength between the left pixel and the first right pixel. The first disparity value and the first match strength are depicted as a point 808 in FIG. 8.

A second right pixel may be selected for the left pixel from the right image, and a right image patch 806 for the second right pixel may be determined. A second disparity value may be determined as an offset from the left pixel to the second right pixel. The left image patch 802 may be compared to the right image patch 806 to determine a second match strength between the left pixel and the second right pixel. The second disparity value and the second match strength are depicted as a point 812 in FIG. 8.

Similarly, other disparity values and corresponding match strengths may be determined for the left pixel. For example, a point 814 may depict a third disparity value and a third match strength for the left pixel, and a point 816 may depict a fourth disparity value and a fourth match strength for the left pixel. A quadratic interpolation may be performed at a peak region of the match strengths as illustrated by a curve 818. A match score and a disparity value associated with the match score may be determined as a peak point in the curve 818, as illustrated at a point 810. Thus, the match score and the disparity value associated with the match score may be stored for the left pixel in a disparity map that maps the left image to the right image.

FIG. 9 is a graphic representation 900 that illustrates an example boundary refinement at image areas of discontinuous disparity changes according to some implementations. A left image 902 is illustrated in FIG. 9, which includes a foreground portion and a background portion. A right image 904 is also illustrated in FIG. 9, which includes the foreground portion, the background portion, and an occlusion portion 906 at a boundary between the foreground portion and the background portion. In estimation of disparity maps, the occlusion portion 906 may be modeled by leaving out a gap that spans the occlusion portion.

Figure 10A:
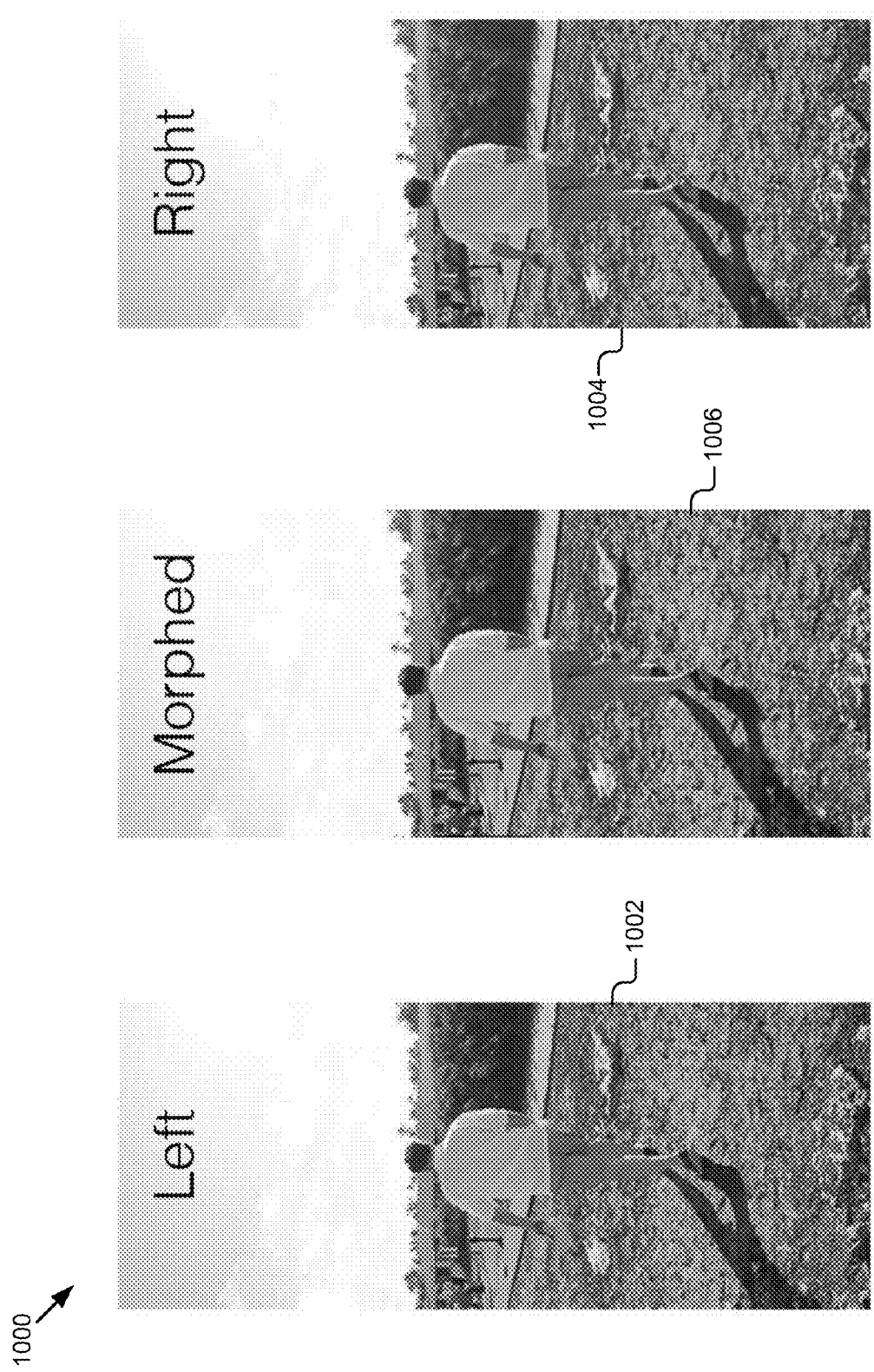
FIG. 10A is a graphic representation that illustrates an example morphed image generated from a left image and a right image according to some implementations.
Figure 10B:
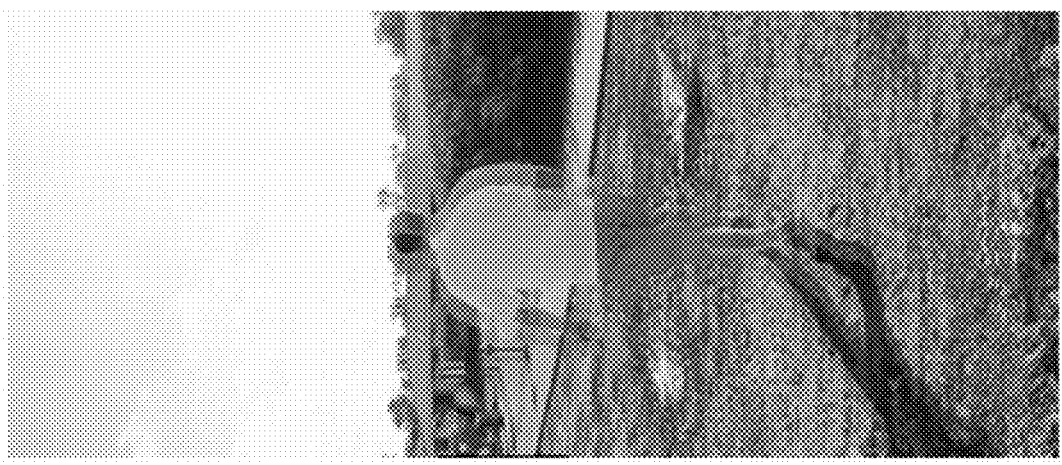
FIG. 10B is a graphic representation that illustrates an example 3D morphed image generated from the left image and the right image of FIG. 10A.

FIG. 10A is a graphic representation 1000 that illustrates an example morphed image 1006 generated from a left image 1002 and a right image 1004 according to some implementations. FIG. 10B is a graphic representation 1050 that illustrates an example 3D morphed image generated from the left image 1002 and the right image 1004 of FIG. 10A.

The implementations described herein may include the use of a special purpose or general-purpose computer including various computer hardware or software modules, as discussed in greater detail below.

Implementations described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some implementations, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the disclosure and the concepts contributed by the inventor to furthering the art, and are to be construed as being without limitation to such specifically recited examples and conditions. Although implementations of the present disclosures have been described in detail, it may be understood that the various changes, substitutions, and alterations could be made hereto without departing from the spirit and scope of the disclosure.

What is claimed is:

1. A method comprising:

receiving a group of images captured at a particular time by a group of camera modules, the group of camera modules configured to form camera pairs with respective overlap fields of view, the camera pairs including a first camera module and a second camera module that have an overlap field of view, the group of images including a first image captured by the first camera module and a second image captured by the second camera module, the first image including a first sub-image that covers at least part of the overlap field of view, and the second image including a second sub-image that covers the at least part of the overlap field of view;

calibrating the group of images;

generating, by a processor-based computing device programmed to perform the generating, pairs of disparity maps associated with the camera pairs, the generating including generating a corresponding pair of disparity maps for each camera pair from the camera pairs;

creating morphed images from the group of images by applying morphed rendering, the creating including:

for each camera pair that captures the first image and the second image in the group of images and is associated with the corresponding pair of disparity maps, generating a corresponding one of the morphed images from the first image and the second image based on the corresponding pair of disparity maps by:

determining view positions of a slit camera for multiple slit views as the slit camera co-locates between the first camera module and the second camera module, wherein each view position of the slit camera is determined by a scalar $\alpha$ with a value between a first value and a second value, where $\alpha$=the first value indicates that the slit camera co-locates with the first camera module and $\alpha$=the second value indicates that the slit camera co-locates with the second camera module;

generating, from the first sub-image and the second sub-image, multiple sets of pixels for the multiple slit views based on the corresponding pair of disparity maps and the view positions, each slit view at a corresponding view position being associated with a corresponding set of pixels from the multiple sets of pixels; and combining the multiple sets of pixels to form the corresponding one of the morphed images; and constructing a left panoramic image and a right panoramic image from the morphed images.

2. The method of claim 1, wherein:

creating the corresponding pair of disparity maps for each camera pair includes creating a first disparity map that maps the first sub-image to the second sub-image and a second disparity map that maps the second sub-image to the first sub-image.

3. The method of claim 2, wherein creating the first disparity map that maps the first sub-image to the second sub-image comprises:

preprocessing the first sub-image and the second sub-image to normalize the first sub-image and the second sub-image;

determining a first group of disparity vectors for a first group of pixels in the first sub-image;

marking a second group of pixels in the first sub-image with unknown disparity vectors;

applying a consistency test to the first group of pixels, the applying includes:

determining a first sub-group of pixels that pass the consistency test from the first group of pixels, the first sub-group of pixels being associated with a first sub-group of disparity vectors from the first group of disparity vectors;

determining a second sub-group of pixels that fail the consistency test from the first group of pixels; and marking the second sub-group of pixels with unknown disparity vectors;

estimating a second group of disparity vectors for the second group of pixels and a second sub-group of disparity vectors for the second sub-group of pixels; and generating the first disparity map that includes the first sub-group of disparity vectors for the first sub-group of pixels, the second sub-group of disparity vectors for the second sub-group of pixels, and the second group of disparity vectors for the second group of pixels.

4. The method of claim 3, further comprising performing boundary refinement at image areas with discontinuous disparity changes.

5. The method of claim 1, wherein generating the multiple sets of pixels for the multiple slit views includes, for the $\alpha$=the first value, the first sub-image is not shifted and the second sub-image is shifted to become the first sub-image and for the $\alpha$=the second value, the first sub-image is shifted to become the second image and the second sub-image is not shifted.

6. The method of claim 1, wherein the corresponding one of the morphed images represents a gradual morphing from the first sub-image to the second sub-image.

7. The method of claim 1, further comprising:

filling in pixels of the left panoramic image that are skipped during the morphed rendering; and filling in pixels of the right panoramic image that are skipped during the morphed rendering.

8. A system comprising:

one or more processors;

one or more non-transitory tangible computer readable mediums communicatively coupled to the one or more processors and storing executable instructions executable by the one or more processors to perform operations comprising:

receiving a group of images captured at a particular time by a group of camera modules, the group of camera modules configured to form camera pairs with respective overlap fields of view, the camera pairs including a first camera module and a second camera module that have an overlap field of view, the group of images including a first image captured by the first camera module and a second image captured by the second camera module, the first image including a first sub-image that covers at least part of the overlap field of view, and the second image including a second sub-image that covers the at least part of the overlap field of view;

calibrating the group of images;

generating, by a processor-based computing device programmed to perform the generating, pairs of disparity maps associated with the camera pairs, the generating including generating a corresponding pair of disparity maps for each camera pair from the camera pairs, wherein the corresponding pair of disparity maps includes creating a first disparity map that maps the first sub-image to the second sub-image and a second disparity map that maps the second sub-image to the first sub-image by:
  preprocessing the first sub-image and the second sub-image to normalize the first sub-image and the second sub-image;
  determining a first group of disparity vectors for a first group of pixels in the first sub-image
  marking a second group of pixels in the first sub-image with unknown disparity vectors;
  applying a consistency test to the first group of pixels, the applying including
    determining a first sub-group of pixels that pass the consistency test from the first group of pixels, the first sub-group of pixels being associated with a first sub-group of disparity vectors from the first group of disparity vectors;
    determining a second sub-group of pixels that fail the consistency test from the first group of pixels; and
    marking the second sub-group of pixels with unknown disparity vectors;
  estimating a second group of disparity vectors for the second group of pixels and a second sub-group of disparity vectors for the second sub-group of pixels; and
  generating the first disparity map that includes the first sub-group of disparity vectors for the first sub-group of pixels, the second sub-group of disparity vectors for the second sub-group of pixels, and the second group of disparity vectors for the second group of pixels;
creating morphed images from the group of images by applying morphed rendering, the creating including:
  for each camera pair that captures the first image and the second image in the group of images and is associated with the corresponding pair of disparity maps, generating a corresponding one of the morphed images from the first image and the second image based on the corresponding pair of disparity maps by:
    determining view positions of a slit camera for multiple slit views as the slit camera co-locates between the first camera module and the second camera module, wherein each view position of the slit camera is determined by a scalar $\alpha$ with a value between a first value and a second value, where $\alpha$=the first value indicates that the slit camera co-locates with the first camera module and $\alpha$=the second value indicates that the slit camera co-locates with the second camera module
    generating, from the first sub-image and the second sub-image, multiple sets of pixels for the multiple slit views based on the corresponding pair of disparity maps and the view positions, each slit view at a corresponding view position being associated with a corresponding set of pixels from the multiple sets of pixels; and
    combining the multiple sets of pixels to form the corresponding one of the morphed images; and
  constructing a left panoramic image and a right panoramic image from the morphed images.

9. The system of claim 8, further comprising:
determining a two-dimensional search region in the first sub-image;
assessing pixel similarity between pixels from the two-dimensional search region; and
recording the first group of disparity vectors as two-dimensional offset vectors.

10. The system of claim 8, wherein the second sub-group of pixels fail the consistency test based on a difference in pixel color.

11. The system of claim 8, wherein the operations further comprise performing boundary refinement at image areas with discontinuous disparity changes.

12. The system of claim 8, wherein generating the multiple sets of pixels for the multiple slit views includes, for the $\alpha$=the first value, the first sub-image is not shifted and the second sub-image is shifted to become the first sub-image and for the $\alpha$=the second value, the first sub-image is shifted to become the second image and the second sub-image is not shifted.

13. The system of claim 12, wherein the corresponding one of the morphed images represents a gradual morphing from the first sub-image to the second sub-image.

14. The system of claim 8, wherein the operations further comprise:
  filling in pixels of the left panoramic image that are skipped during the morphed rendering; and
  filling in pixels of the right panoramic image that are skipped during the morphed rendering.

15. A computer program product comprising a non-transitory computer-usable medium including a computer-readable program, wherein the computer-readable program when executed on a computer causes the computer to perform operations comprising:
  receiving a group of images captured at a particular time by a group of camera modules, the group of camera modules configured to form camera pairs with respective overlap fields of view, the camera pairs including a first camera module and a second camera module that have an overlap field of view, the group of images including a first image captured by the first camera module and a second image captured by the second camera module, the first image including a first sub-image that covers at least part of the overlap field of view, and the second image including a second sub-image that covers the at least part of the overlap field of view;
  calibrating the group of images;
  generating, by a processor-based computing device programmed to perform the generating, pairs of disparity maps associated with the camera pairs, the generating including generating a corresponding pair of disparity maps for each camera pair from the camera pairs;
  creating morphed images from the group of images by applying morphed rendering, the creating including:
    for each camera pair that captures the first image and the second image in the group of images and is associated with the corresponding pair of disparity maps, generating a corresponding one of the morphed images from the first image and the second image based on the corresponding pair of disparity maps by:
      determining view positions of a slit camera for multiple slit views as the slit camera co-locates between the first camera module and the second camera module, wherein each view position of the slit camera is determined by a scalar $\alpha$ with a value between a first value and a second value, where $\alpha$=the first value indicates that the slit camera co-locates with the first camera module and α=the second value indicates that the slit camera co-locates with the second camera module;

generating, from the first sub-image and the second sub-image, multiple sets of pixels for the multiple slit views based on the corresponding pair of disparity maps and the view positions, each slit view at a corresponding view position being associated with a corresponding set of pixels from the multiple sets of pixels; and combining the multiple sets of pixels to form the corresponding one of the morphed images; and constructing a left panoramic image and a right panoramic image from the morphed images.

16. The computer program product of claim 15, wherein:

creating the corresponding pair of disparity maps for each camera pair includes creating a first disparity map that maps the first sub-image to the second sub-image and a second disparity map that maps the second sub-image to the first sub-image.

17. The computer program product of claim 16, wherein creating the first disparity map that maps the first sub-image to the second sub-image comprises:

preprocessing the first sub-image and the second sub-image to normalize the first sub-image and the second sub-image;

determining a first group of disparity vectors for a first group of pixels in the first sub-image;

marking a second group of pixels in the first sub-image with unknown disparity vectors;

applying a consistency test to the first group of pixels, the applying includes:

determining a first sub-group of pixels that pass the consistency test from the first group of pixels, the first sub-group of pixels being associated with a first sub-group of disparity vectors from the first group of disparity vectors;

determining a second sub-group of pixels that fail the consistency test from the first group of pixels; and marking the second sub-group of pixels with unknown disparity vectors;

estimating a second group of disparity vectors for the second group of pixels and a second sub-group of disparity vectors for the second sub-group of pixels; and generating the first disparity map that includes the first sub-group of disparity vectors for the first sub-group of pixels, the second sub-group of disparity vectors for the second sub-group of pixels, and the second group of disparity vectors for the second group of pixels.

18. The computer program product of claim 17, further comprising performing boundary refinement at image areas with discontinuous disparity changes.

19. The computer program product of claim 15, wherein generating the multiple sets of pixels for the multiple slit views includes, for the α=the first value, the first sub-image is not shifted and the second sub-image is shifted to become the first sub-image and for the α=the second value, the first sub-image is shifted to become the second image and the second sub-image is not shifted.

20. The computer program product of claim 15, wherein the corresponding one of the morphed images represents a gradual morphing from the first sub-image to the second sub-image.

* * * * *